(12) United States Patent
Ioffe et al.

(10) Patent No.: US 12,549,937 B2
(45) Date of Patent: Feb. 10, 2026

(54) MULTIPLE SIM CARD OPERATION OF AN ELECTRONIC DEVICE

(71) Applicant: Apple Inc., Cupertino, CA (US)

(72) Inventors: Anatoliy Sergey Ioffe, Sunnyvale, CA (US); Alexander Sayenko, Munich (DE); Elmar Wagner, Taufkirchen (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/734,908

(22) Filed: Jun. 5, 2024

(65) Prior Publication Data

US 2024/0323671 A1    Sep. 26, 2024

Related U.S. Application Data

(63) Continuation of application No. 17/872,849, filed on Jul. 25, 2022, now Pat. No. 12,035,413, which is a
(Continued)

(51) Int. Cl.
*H04W 68/00* (2009.01)
*H04W 8/18* (2009.01)
(Continued)

(52) U.S. Cl.
CPC .......... *H04W 8/183* (2013.01); *H04W 60/00* (2013.01); *H04W 68/005* (2013.01); *H04W 76/28* (2018.02)

(58) Field of Classification Search
None
See application file for complete search history.

(56) References Cited

U.S. PATENT DOCUMENTS 9,445,417 B2    9/2016  Hsu et al.
10,772,152 B2 * 9/2020 Rune ................... H04W 76/28
(Continued)

FOREIGN PATENT DOCUMENTS

CN    101521935 A    9/2009
CN    101521959 A    9/2009
(Continued)

OTHER PUBLICATIONS

An Jun; "Research on Interference of Multi-Moda and Multi-Band L TE_ Terminals"; Chinese Excellent Master's ThesisCollection; Apr. 1, 2016; 101 pgs.
(Continued)

*Primary Examiner* — Gary Lafontant
(74) *Attorney, Agent, or Firm* — Fletcher Yoder, P.C.

(57) ABSTRACT

An electronic device discussed herein may communicatively couple to a base station. The base station may receive a first paging cycle assignment corresponding to a first subscriber identification module (SIM) card and determine a second paging cycle assignment for use with a second SIM card. The second paging cycle assignment may be generated based on the first paging cycle assignment. The base station may communicate with the electronic device using the second paging cycle assignment. The second paging cycle assignment may guide the base station to transmit data to the electronic device without interrupting a transmission made according to the first paging cycle assignment.

20 Claims, 20 Drawing Sheets

Related U.S. Application Data continuation of application No. 16/920,489, filed on Jul. 3, 2020, now Pat. No. 11,399,273.

(60) Provisional application No. 62/910,843, filed on Oct. 4, 2019.

(51) Int. Cl.
*H04W 60/00* (2009.01)
*H04W 76/28* (2018.01)

(56) References Cited

U.S. PATENT DOCUMENTS

| | | |
|---|---|---|
| 2009/0215472 A1 | 8/2009 | Hsu |
| 2009/0215473 A1 | 8/2009 | Hsu |
| 2012/0264483 A1 | 10/2012 | Chin et al. |
| 2013/0203461 A1 | 8/2013 | Li |
| 2013/0303203 A1 | 11/2013 | Wang et al. |
| 2014/0364118 A1 | 12/2014 | Belghoul et al. |
| 2015/0038154 A1 | 2/2015 | Ponukurnati et al. |
| 2016/0119896 A1 | 4/2016 | Jujaray et al. |
| 2016/0174187 A1 | 6/2016 | Krishnan et al. |
| 2016/0330653 A1 | 11/2016 | Yang et al. |
| 2018/0077728 A1 | 3/2018 | Shi et al. |
| 2018/0184309 A1 | 6/2018 | Bhardwaj et al. |
| 2018/0249349 A1 | 8/2018 | Hu et al. |
| 2020/0396714 A1 | 12/2020 | Lee |

FOREIGN PATENT DOCUMENTS

| | | | |
|---|---|---|---|
| CN | 101940043 A | 1/2011 | |
| CN | 102783244 A | 11/2012 | |
| CN | 103139387 A | 6/2013 | |
| CN | 107623900 A | 1/2018 | |
| CN | 108616873 | 10/2018 | |
| EP | 3344000 A1 | 7/2018 | |
| EP | 3301988 B1 | 5/2019 | |
| EP | 3764686 A1 | 1/2021 | |
| WO | WO-2013124046 A1 * | 8/2013 | ........ H04W 36/0072 |
| WO | 2016191916 A1 | 12/2016 | |
| WO | 2019164325 A1 | 8/2019 | |

OTHER PUBLICATIONS

Qualcomm Incorporated Oppo, China Unicom, Vivo, 82-174243; "Avoidance of paging collisions to minimize outage of services"; 3GPP tsg_saWG2_Arch, No. TSGS2_ 122_Cabo; pp. 1-8.

Office Action for CN Patent Application No. 202011072009.5 dated Dec. 22, 2023; 11 pgs.

Qualcomm Incorporated et al.; "Avoidance of paging collisions to minimize outage of services", 3GPP Draft; S2-174243-PAGiNG Collision_V8, 3rd Generation Partnership Project (#GPP), Mobile Competence Centre; 650, Route Des Lucioles, F-06921 Sophia-Antipoliz Cedex; France; vol. SAWG@, No. San Jose Del Cabo; Jun. 26, 2017-Jun. 30, 2017, Jun. 25, 2017 (XP051303098): retrieved frorn internet http://www.3gpp.org/ftp/Meetings 3GPPSYNC/SA2/Docs/.

Vivo: "vivo views on NR Rei-17", 3GPP Draft; RP-190833 Vivo Views on REL-17, 3rd Generation Partnership Project (DGPP), Mobile Competence Centre; 650, Route Des Lucioles, F-06921 Sophia-Antipoliz Cedex; France; Vo. TSG RAN, No. Newport Beach, USA; Jun. 3, 2019-Jun. 6, 2019, May 27, 2019 (XP051739154), retrieved from internet: http//www.3gpp.org/ftp/tsg%5Fran/TSGR%5FRAN/TSGR%5F84/Docs/RP%2D190833%2Ezip.

* cited by examiner

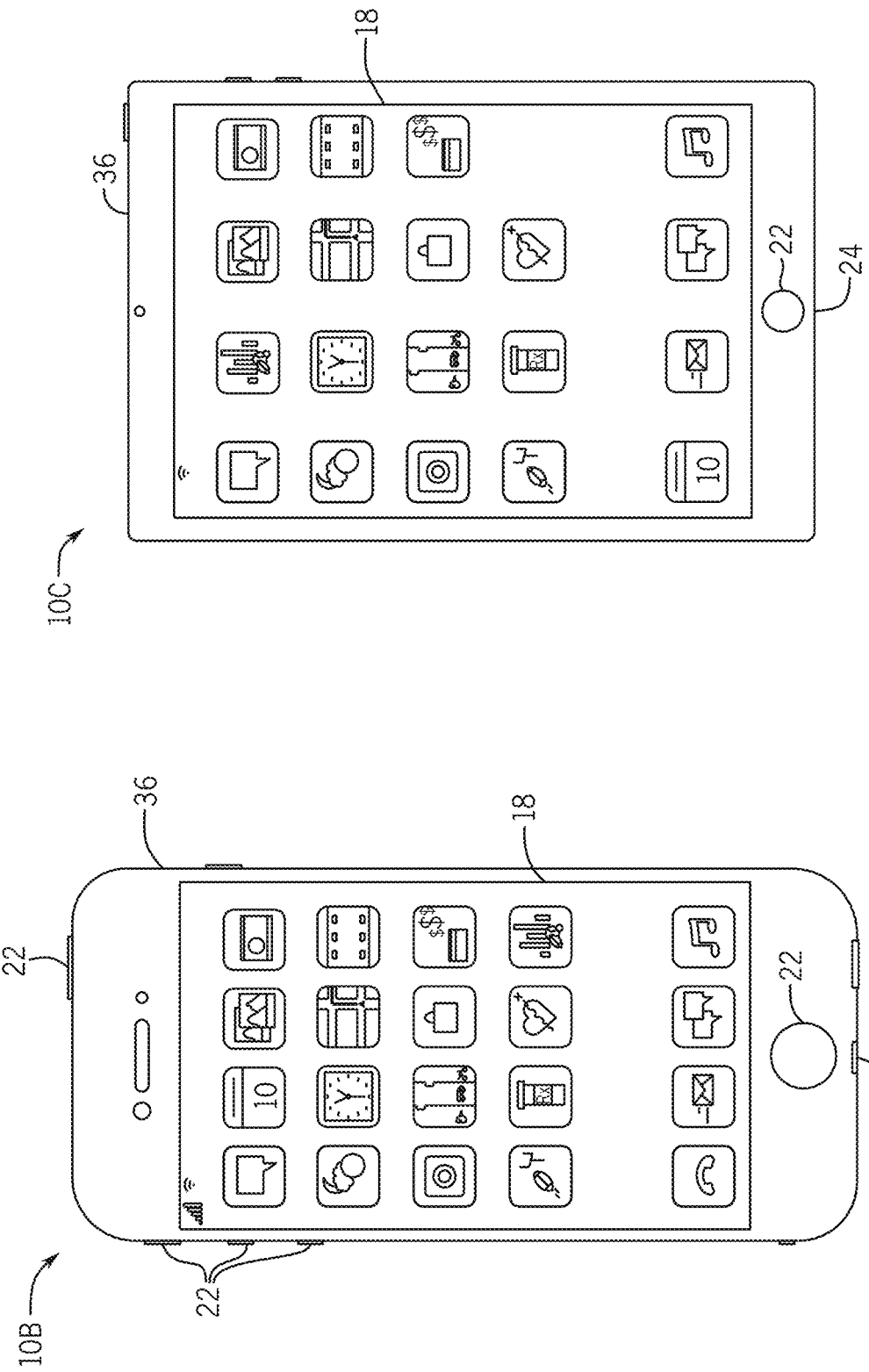

MULTIPLE SIM CARD OPERATION OF AN ELECTRONIC DEVICE

CROSS-REFERENCE TO RELATED APPLICATIONS

This application is a continuation of U.S. patent application Ser. No. 17/872,849, filed Jul. 25, 2022, which is a continuation of U.S. patent application Ser. No. 16/920,489, filed Jul. 3, 2020, which is now U.S. Pat. No. 11,399,273, which claims priority to U.S. Provisional Application No. 62/910,843, filed Oct. 4, 2019, each of which is hereby incorporated by reference in its entirety for all purposes.

BACKGROUND

The present disclosure relates generally to electronic devices, and more particularly, to electronic devices that utilize radio frequency signals, transmitters, and receivers in various processes, such as cellular and wireless communication processes.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Wireless communication systems are rapidly growing in usage. In recent years, wireless devices such as smartphones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Transmitters and/or receivers may be included in various electronic devices to enable communication between user equipment (e.g., user electronic devices, transmitting or receiving electronic devices) and core networks on said wireless networks, deployed through a variety of technologies including but not limited to access network base stations (e.g., network access nodes), such as an eNodeB (eNB) for long-term evolution (LTE) access networks and/or a next generation NodeB (gNB) for $5^{th}$ generation (5G) access networks. In some electronic devices, a transmitter and a receiver are combined to form a transceiver. Transceivers may transmit and/or receive wireless signals by way of an antenna coupled to the transceiver, such as radio frequency (RF) signals indicative of data. Indeed, a transceiver may include a subscriber identification module (SIM) card to communicate with a core network of a provider. The transceiver, however, may not have the capability to use multiple SIM cards to simultaneously communicate with multiple core networks.

By way of example, an electronic device may include a transceiver to transmit and/or receive the RF signals over one or more frequencies of a wireless network. The information to be transmitted is typically modulated onto the RF signal before transmission. In other words, the information to be transmitted is typically embedded in an envelope of a carrier signal that has a frequency in a frequency range of a network being used for communication. To embed or extract the information in or from the envelope of the carrier signal, processing may be performed on a received RF signal according to transmission parameters. For example, an electronic device (e.g., user equipment) may demodulate the RF signal (e.g., to remove the carrier signal) to recover the embedded information in the envelope based on a frequency of the received RF signal.

The transmission parameters and other settings, such as information used to authenticate an electronic device to a network, may be provided to the electronic device by way of a subscriber identification module (SIM) card and/or by way of an embedded SIM (eSIM) that includes a digital information sometimes included in a SIM card that permits activation to a cellular plan from a carrier without having use a physical SIM card. The SIM card (or eSIM) enables the electronic device to communicate with a core network of a provider. The core network may be a wireless network, such as Wi-Fi or Ethernet, that facilitates the wireless transmission of information between the electronic device and the provider. In some cases, it may be desired to communicate with two or more core networks using the same electronic device. To do so, multiple SIM cards may be installed in the same electronic device.

However, when an electronic device tries to use multiple SIM cards, issues sometimes arise, including missed communications (e.g., missed paging notification) and/or device unavailability. For example, when a first SIM card of the electronic device is active, a second SIM card of the electronic device may deactivate and be unavailable. As such, if a core network transmits a paging notification to the second SIM card while the first SIM card is active (where the paging notification may initiate a communication window that enables the second SIM card to communicate with the core network), the second SIM card may miss the paging request and/or may not respond to an incoming data packet from the core network because the second SIM card may be unavailable.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure generally relate to a transceiver of an electronic device (e.g., user equipment) that receives and/or transmits wireless data signals, such as radio frequency (RF) signals. In certain embodiments, the transceiver may include RF circuitry (e.g., Wi-Fi and/or LTE RF circuitry, front end circuitry) that is used, for example, to support transmission and/or reception of RF signals that follow various wireless communication standards or additional communication standards. The RF circuitry may include two or more subscriber identification module (SIM) cards, such as physical SIM cards and/or embedded SIM (eSIM) cards. A SIM card enables the electronic device to communicate with a core network of a network provider via base stations (e.g., network access nodes), and an eSIM card includes similar or same information as the SIM card but is embedded in the phone as to not specifically be a physical SIM card removable from the hardware. The core network may be a cellular network (e.g., long term evolution (LTE), $3^{rd}$ Generation (3G), $4^{th}$ Generation (4G), $5^{th}$ Generation (5G)) that facilitates the wireless transmission of information between the electronic device and the provider.

The electronic device may operate according to various processes to enable communication with respective core networks via corresponding SIM cards. In each case, the electronic device is assigned paging cycles (e.g., provided a paging cycle assignment) that define when each SIM card is to operate in a transmission mode, when each SIM card is to operate in a reduced power mode, and/or the amount of time the SIM card is to spend operating in each mode. In this way, the paging cycle assignments define communication patterns for each of the SIM cards used by the electronic device when communicating with multiple core networks. Following or conforming to the paging cycle assignments may reduce or eliminate missed communications between the core network and the corresponding SIM card due to conflicting transmission patterns (such as when the core network attempts to communicate with the electronic device via the corresponding SIM card when the corresponding SIM card is unavailable).

Indeed, in a first embodiment, a method of operating an electronic device may include registering a first subscriber identification module (SIM) card to a first core network. The electronic device may include the first SIM card and a second SIM card. The method may involve registering the second SIM card to a second core network after registering the first SIM card to the first core network and receiving a first paging cycle for the first SIM card from the first core network and a second paging cycle for the second SIM card from the second core network. The first paging cycle may define a first set of transmission periods for the electronic device to transmit data to the first core network. The second paging cycle may define a second set of transmission periods for the electronic device to transmit data to the second core network, and the second paging cycle may be determined based on the first paging cycle. The method may include communicating with the first core network using the first SIM card based on the first paging cycle and communicating with the second core network using the second SIM card based on the second paging cycle.

In another embodiment, a method of operating a first base station may include registering a first subscriber identification module (SIM) card of an electronic device to a first core network. The method may include generating a first paging cycle corresponding to the first SIM card and transmitting the first paging cycle corresponding to the first SIM card to a second base station or to the electronic device. Furthermore, the method may include communicating with the electronic device according to the first paging cycle without interrupting a transmission of information between a second SIM card of the electronic device and the second base station.

In yet another embodiment, an electronic device may include a first subscriber identification module (SIM) card that receives a first paging cycle and a second SIM card that receives a second paging cycle. The electronic device may include a radio frequency chain that communicatively couples to a base station, that receives data from a first core network using the first SIM card according to the first paging cycle, and that sends the first paging cycle to the base station. In some cases, the base station may receive the first paging cycle from the electronic device, determine the second paging cycle for use with the second SIM card based on the first paging cycle, and communicate with the electronic device using the second SIM card according to the second paging cycle. The second paging cycle may cause the base station to transmit data to the electronic device without interrupting a transmission made according to the first paging cycle.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 3 is a front view of a hand-held device representing a second embodiment of the electronic device of FIG. 1;

FIG. 4 is a front view of another hand-held device representing a third embodiment of the electronic device of FIG. 1;

DETAILED DESCRIPTION

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Various processes may be used to determine the paging cycle assignments. The processes may apply to a variety of electronic devices, including electronic devices that have one RF chain and/or electronic devices that have two or more RF chains. Some processes may use communication and cooperation between core networks (and thus between providers of the core networks), while additional or alternative processes use the electronic device as a way to facilitate the transmission of information between the core networks.

Various processes are disclosed that may adjust operation of user equipment (e.g., electronic devices). The processes may apply to a variety of electronic devices. These processes may be combined to bring certain advantages to operation, as is described herein. With the foregoing in mind, a general description of suitable electronic devices that may include such a transceiver is provided below.

Figure 1:
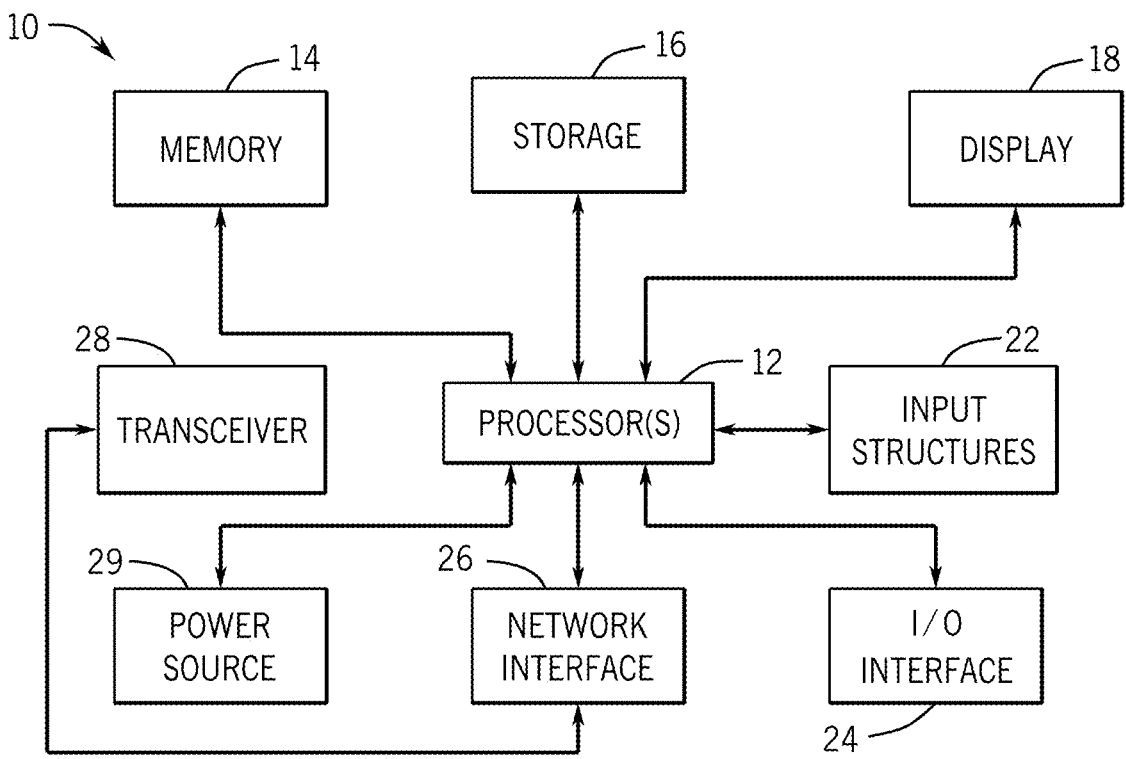
FIG. 1 is a schematic block diagram of an electronic device including a transceiver, in accordance with an embodiment.

Turning first to FIG. 1, an electronic device 10 according to an embodiment of the present disclosure may include, among other things, one or more of processor(s) 12, memory 14, nonvolatile storage 16, a display 18, input structures 22, an input/output (I/O) interface 24, a network interface 26, a transceiver 28, and a power source 29. The various functional blocks shown in FIG. 1 may include hardware elements (including circuitry), software elements (including computer code stored on a computer-readable medium) or a combination of both hardware and software elements. Furthermore, a combination of elements may be included in tangible, non-transitory, and machine-readable medium that include machine-readable instructions. The instructions may be executed by one or more processors and may cause the one or more processors to perform operations as described herein. It should be noted that FIG. 1 is merely one example of a particular embodiment and is intended to illustrate the types of elements that may be present in the electronic device 10.

Figure 2:
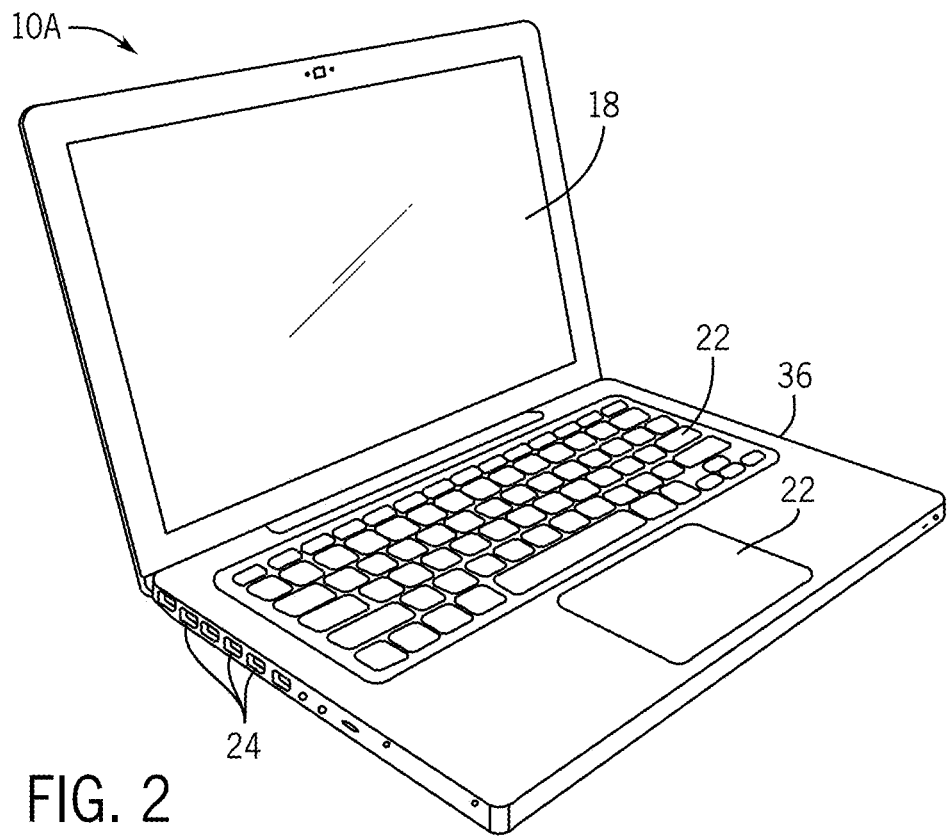
FIG. 2 is a perspective view of a notebook computer representing a first embodiment of the electronic device of FIG. 1.
Figure 5:
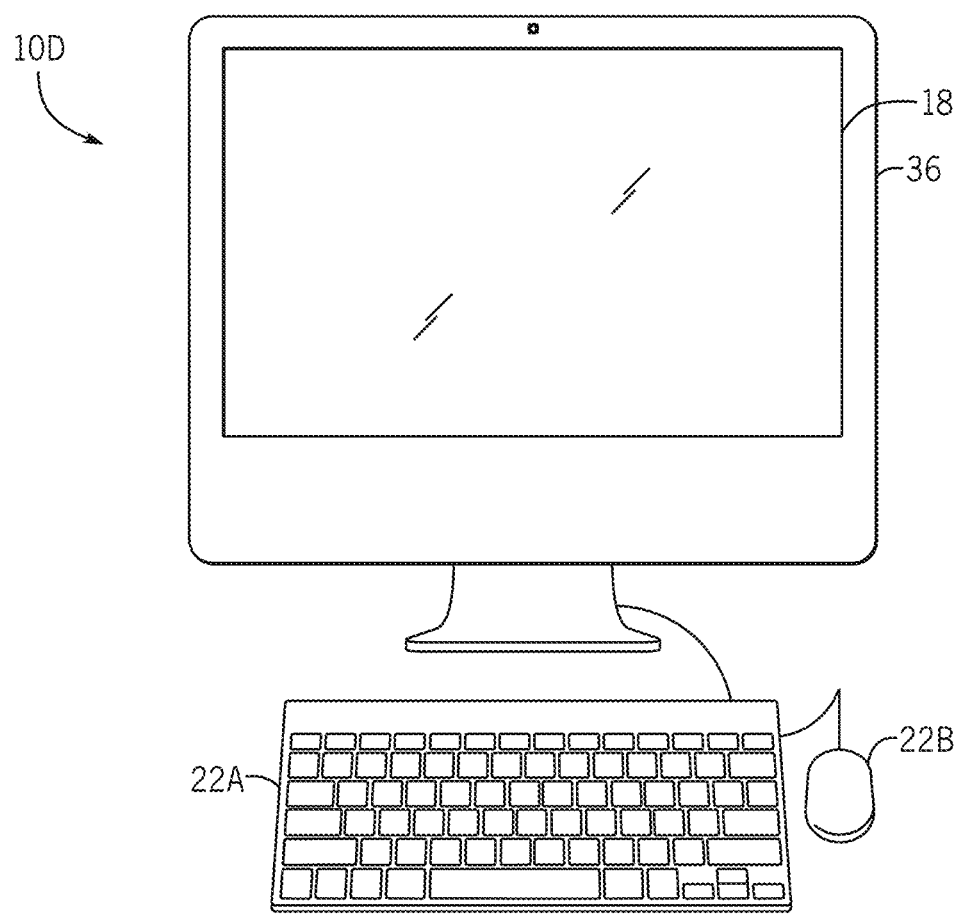
FIG. 5 is a front view of a desktop computer representing a fourth embodiment of the electronic device of FIG. 1.
Figure 6:
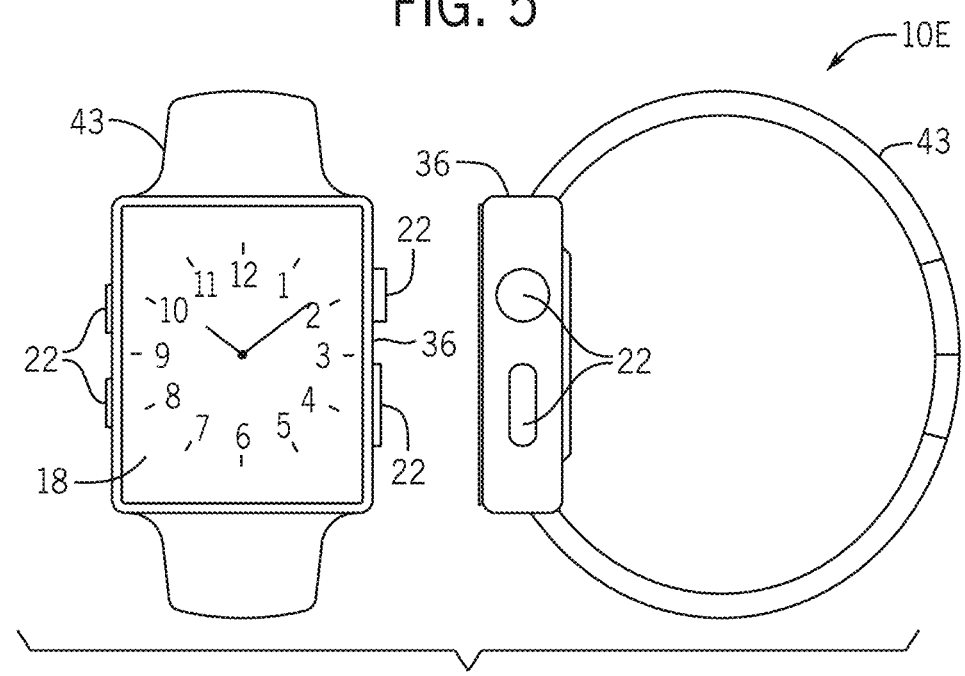
FIG. 6 is a front view and side view of a wearable electronic device representing a fifth embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may operably couple with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or processes, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions executable by the processor(s) 12 to enable the electronic device 10 to provide various functionalities.

In certain embodiments, the display 18 may be a liquid crystal display (LCD), which may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a $3^{rd}$ generation (3G) cellular network, $4^{th}$ generation (4G) cellular network, long term evolution (LTE) cellular network, long term evolution license assisted access (LTE-LAA) cellular network, or $5^{th}$ generation (5G) cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-wideband (UWB), alternating current (AC) power lines, and so forth.

In some embodiments, the electronic device 10 communicates over the aforementioned wireless networks (e.g., Wi-Fi, WiMAX, mobile WiMAX, 4G, LTE, 5G, and so forth) using the transceiver 28. The transceiver 28 may include circuitry useful in both wirelessly receiving and wirelessly transmitting signals (e.g., data signals, wireless data signals, wireless carrier signals, RF signals), such as a transmitter and/or a receiver. Indeed, in some embodiments, the transceiver 28 may include a transmitter and a receiver combined into a single unit, or, in other embodiments, the transceiver 28 may include a transmitter separate from a receiver. The transceiver 28 may transmit and receive RF signals to support voice and/or data communication in wireless applications such as, for example, PAN networks (e.g., Bluetooth), WLAN networks (e.g., 802.11x Wi-Fi), WAN networks (e.g., 3G, 4G, 5G, and LTE and LTE-LAA cellular networks), WiMAX networks, mobile WiMAX networks, ADSL and VDSL networks, DVB-T and DVB-H networks, UWB networks, and so forth. As further illustrated, the electronic device 10 may include the power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers) and/or those that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, California. By way of example, the electronic device 10, taking the form of a notebook computer 10A, is illustrated in FIG. 2 in accordance with one embodiment of the present disclosure. The notebook computer 10A may include a housing or the enclosure 36, the display 18, the input structures 22, and ports associated with the I/O interface 24. In one embodiment, the input structures 22 (such as a keyboard and/or touchpad) may enable interaction with the notebook computer 10A, such as starting, controlling, or operating a graphical user interface (GUI) and/or applications running on the notebook computer 10A. For example, a keyboard and/or touchpad may facilitate user interaction with a user interface, GUI, and/or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, California. The handheld device 10B may include the enclosure 36 to protect interior elements from physical damage and to shield them from electromagnetic interference. The enclosure 36 may surround the display 18. The I/O interface 24 may open through the enclosure 36 and may include, for example, an I/O port for a hard wired connection for charging and/or content manipulation using a standard connector and protocol, such as the Lightning connector provided by Apple Inc. of Cupertino, California, a universal serial bus (USB), or other similar connector and protocol.

The input structures 22, in combination with the display 18, may enable user control of the handheld device 10B. For example, the input structures 22 may activate or deactivate the handheld device 10B, navigate a user interface to a home screen, present a user-editable application screen, and/or activate a voice-recognition feature of the handheld device 10B. Other of the input structures 22 may provide volume control, or may toggle between vibrate and ring modes. The input structures 22 may also include a microphone to obtain a user's voice for various voice-related features, and a speaker to enable audio playback. The input structures 22 may also include a headphone input to enable input from external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. of Cupertino, California. It should be noted that the computer 10D may also represent a personal computer (PC) by another manufacturer. The enclosure 36 may protect and enclose internal elements of the computer 10D, such as the display 18. In certain embodiments, a user of the computer 10D may interact with the computer 10D using various peripheral input devices, such as keyboard 22A or mouse 22B (e.g., input structures 22), which may operatively couple to the computer 10D.

Similarly, FIG. 6 depicts a wearable electronic device 10E representing another embodiment of the electronic device 10 of FIG. 1. By way of example, the wearable electronic device 10E, which may include a wristband 43, may be an Apple Watch® by Apple Inc. of Cupertino, California. However, in other embodiments, the wearable electronic device 10E may include any wearable electronic device such as, a wearable exercise monitoring device (e.g., pedometer, accelerometer, heart rate monitor), or other device by another manufacturer. The display 18 of the wearable electronic device 10E may include a touch screen version of the display 18 (e.g., LCD, OLED display, active-matrix organic light emitting diode (AMOLED) display, and so forth), as well as the input structures 22, which may facilitate user interaction with a user interface of the wearable electronic device 10E. In certain embodiments, as previously noted above, each embodiment (e.g., notebook computer 10A, handheld device 10B, handheld device 10C, computer 10D, and wearable electronic device 10E) of the electronic device 10 may include the transceiver 28.

Figure 7:
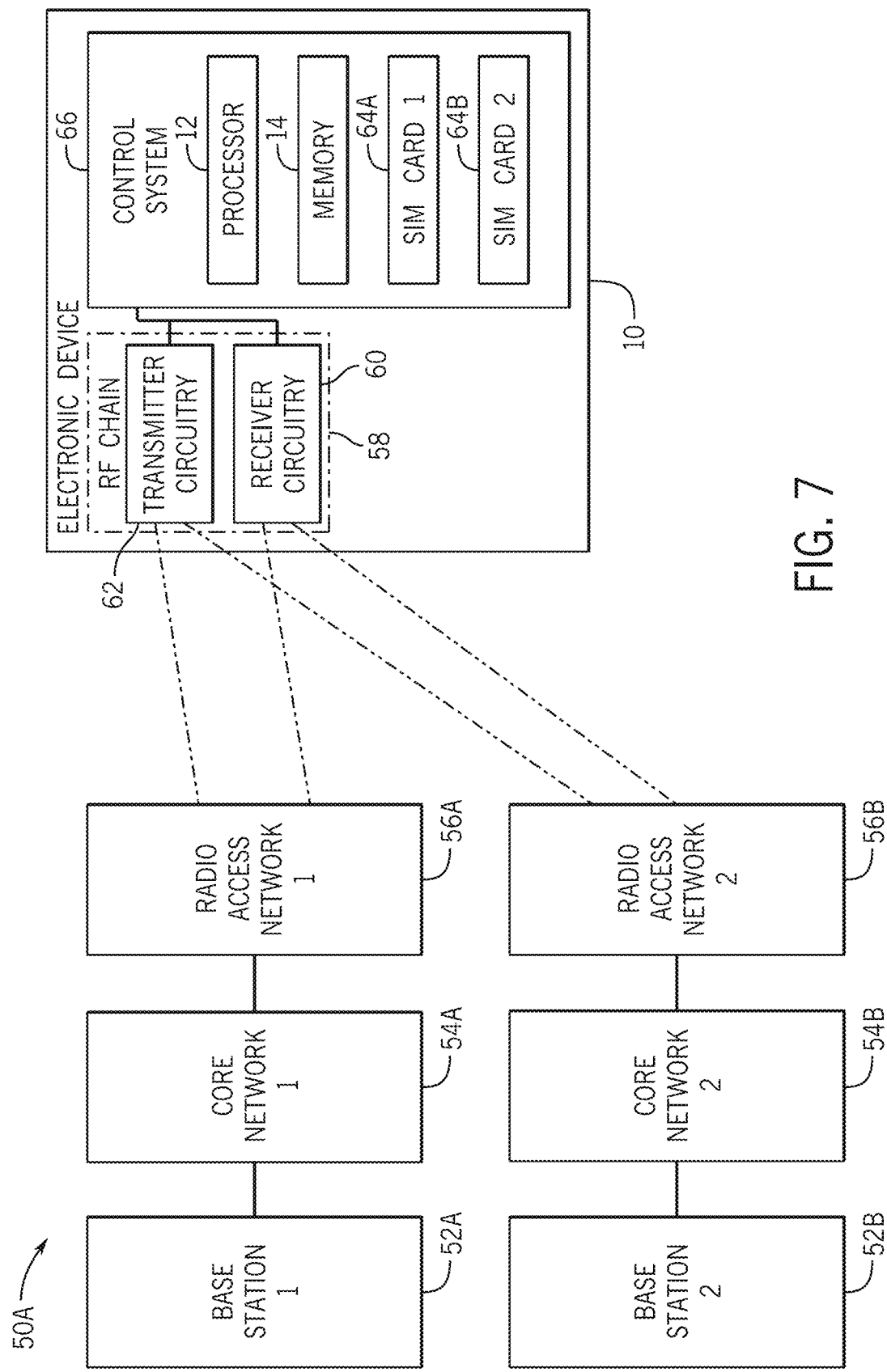
FIG. 7 is a block diagram of multiple base stations communicating with the electronic device of FIG. 1 that includes one radio frequency (RF) component chain (RF chain), in accordance with an embodiment.

With the foregoing in mind, FIG. 7 is a block diagram of a first example communication system 50A that includes access network nodes, such as base stations 52 (52A, 52B) communicating via core networks 54 (54A, 54B) and radio access networks 56 (56A, 56B) with user equipment, such as an electronic device 10 that includes one radio frequency (RF) component chain (RF chain) 58, according to embodiments of the present disclosure. It is noted that user equipment able to communicate with the access nodes may include any of various types of computer systems device which are mobile or portable and which performs wireless communications. Examples of user equipment any suitable portable electronic devices, mobile telephones, smart phones, portable gaming devices, laptops, wearable devices, or the like. In general, the term "UE" or "UE device" can be broadly defined to encompass any electronic, computing, and/or telecommunications device (or combination of devices) which is easily transported by a user and capable of wireless communication.

The term "base station" has the full breadth of its ordinary meaning, and at least includes a wireless communication station installed at a fixed location and used to communicate as part of a wireless telephone system or radio system. The base stations 52 and the electronic device 10 may be configured to communicate over the transmission medium using any of various radio access technologies (RATs), also referred to as wireless communication technologies, or telecommunication standards, such as Global System for Mobile Communications (GSM), Universal Mobile Telecommunications Service (UMTS) (e.g., associated with wide-band Code-Division Multiple Access (WCDMA) or time division (TD) short-band Code-Division Multiple Access (SCDMA) air interfaces), LTE, LTE-Advanced (LTE-A), 5G New Radio (5G NR), High Speed Packet Access (HSPA), 3GPP2 CDMA2000 (e.g., real-time text (1xRTT), Evolution-Data Optimized (1xEV-DO), High Rate Packet Data (HRPD), evolved HRPD (eHRPD)), or the like. Note that if a respective base station of the base stations 52 is implemented in the context of LTE, it may alternately be referred to as an "eNodeB" or "eNB". Note that if a respective base station of the base stations is implemented in the context of 5G NR, it may alternately be referred to as "gNodeB" or "gNB".

Thus, while base stations 52 may act as a "serving cell" for electronic devices as illustrated in FIG. 7, an electronic device 10 may also be capable of receiving signals from (and possibly within communication range of) one or more other cells (which might be provided by base stations 52 and/or any other base stations), which may be referred to as "neighboring cells." Such cells may also be capable of facilitating communication between user devices and/or between user devices and the network. Such cells may include "macro" cells, "micro" cells, "pico" cells, and/or cells which provide any of various other granularities of service area size.

In the illustrated embodiment, the RF chain 58 includes a receiver circuitry 60 separate from a transmitter circuitry 62. The RF chain 58 may be included in the transceiver 28 and may be coupled to an antenna. In some embodiments, the receiver circuitry 60 and the transmitter circuitry 62 may be combined into a single unit within the transceiver 28. Further, the various functional blocks shown in FIG. 7 may include hardware elements (including circuitry), software elements (including computer code stored on a computer-readable medium) or a combination of both hardware and software elements. It should also be noted that FIG. 7 is merely one example of a particular implementation and is intended to illustrate the types of components that may be present. As such, functional blocks may be added or omitted, and their arrangement within the first example communication system 50A may be modified.

The electronic device 10 may include SIM cards 64 (64A, 64B) and may be cell phone or other user equipment that communicates via provided networks (e.g., the core networks 54). In particular, each SIM card 64 may correspond to a respective core network 54 that the electronic device 10 uses to send and/or receive data. Each base station 52 may generate and/or maintain a respective core network 54 that interfaces with the electronic device 10 via a respective radio access network 56. A control system 66 of the electronic device 10 may generate control signals to control incoming and outgoing communications, and may use information stored on each SIM card 64 for encryption and/or decryption operations. Each base station 52 may be an electronic device (e.g., similar to electronic device 10), and thus may include memory 14, processors 12, network interfaces 26, displays 18, I/O interfaces 24, or the like (e.g., as shown in FIG. 1), for performing processing operations associated with maintaining the communication network and for communicating with the electronic device 10.

The core networks 54 may be considered backbone networks. In this way, each core network 54 may interconnect various pieces of its network, providing a data transmission path for the exchange of information between transmitting circuitry and receiving circuitry. Examples of core networks 54 may include wireless networks, Ethernet networks, or the like. The radio access networks 56 may manage terminals (e.g., including the electronic device 10) to facilitate communicating with the electronic device 10. The radio access networks 56 may use different transmission frequencies or transmission bands (e.g., frequency bands) when exchanging data with the SIM cards 64 and/or the electronic device 10. Examples of radio access networks 56 include GSM radio access network (GRAN, GERAN), UMTS radio access network (UTRAN), and Long Term Evolution (LTE) radio access network (E-UTRAN). In alternative or additional embodiments, the electronic device 10 may directly communicate with the core network 54 without the use of a radio access network 56. In some cases, the radio access network 56 (e.g., radio access network 56A, radio access network 56B) may receive preferred transmission bands from the electronic device 10 and may select a transmission frequency or a transmission band from the preferred transmission bands, which may include one or more frequencies as part of a frequency range. The electronic device 10 may, in turn, receive the transmission band or transmission frequency form the radio access network 56 and use the transmission band or transmission frequency in communicating with the radio access network 56. In some cases, the electronic device 10 may receive a transmission band from the radio access network 56 and select a transmission frequency from the transmission band.

During operation of the first example communication system 50A, the electronic device 10 communicates with the base stations 52 via the radio access network 56 and/or the core network 54 to receive or transmit data, such as data associated with receiving or transmitting a phone call, a text message, browsing the internet, or the like. To do so, the receiver circuitry 60 may receive an input signal from the base station 52 that may be processed and/or modified. The input signal may be wirelessly received via an antenna operably connected to the receiver circuitry 60. The input signal may include data transmitted via a carrier waveform. The carrier waveform may be modulated to store the data, and thus data may be retrieved from the input signal for use by the electronic device. In some cases, the electronic device 10 may generate data for transmission to the base station 52. The transmitter circuitry 62 may use similar but reverse modulation and amplification operations as the receiver circuitry 60 to transmit the generated data as a RF signal to the base station 52 via the radio access network 56 and/or the core network 54.

The receiver circuitry 60 may include circuitry to use for processing of the input signal. For example, the receiver circuitry 60 may include a low noise power amplifier (LNA), an analog-to-digital converter (ADC), a baseband filter, or the like, to use to process the input signal. For example, the LNA may receive a relatively low-power signal from the antenna and increase its magnitude without significantly increasing noise of the input signal, generating a modified input signal. The receiver circuitry 60 may sometimes regulate power supplied to the LNA according to average power tracking of the modified input signal or envelope tracking of the input signal. Signals output from the LNA or other circuitry of the receiver circuitry 60 may be transmitted to an ADC for additional processing. For example, the ADC may use any suitable conversion method to convert the output into digital data usable by the electronic device 10. In some embodiments, a baseband filter may receive an output from the ADC and perform additional processing on the initial data recovered from the carrier waveform. The transmitter circuitry 62 may work in a similar but reverse fashion. For example, data to be transmitted to one of the base stations 52 may be modulated onto a carrier signal, amplified for transmission to one of the radio access networks 56, and ultimately received by one of the base stations 52 for use.

The SIM cards 64 may each include circuitry that stores an identity number (e.g., international mobile subscriber identity (IMSI)) used to identify the respective SIM card from other SIM cards. A base station 52 may use the identity number to verify that the SIM card 64 has permission or an authority to receive information via a corresponding core network 54 and/or radio access network 56. For example, the first SIM card 64A may store an identity number that the first base station 52A uses to verify that the first SIM card 64A is authorized to communicate with the first base station 52A via the core network 54A. Since each SIM card 64 corresponds to a different network, each SIM card 64 may include respective identity numbers to identify that particular SIM card 64 to the corresponding base station 52.

The SIM cards 64 may operate according to a 3rd Generation Partnership Project (3GPP)-based communication standard. As part of the communication standard and/or other communication standards, SIM cards 64 may sometimes operate in an RRC_IDLE/RRC_INACTIVE state and may sometimes operate in an RRC_CONNECTED state, wherein RRC refers to radio resource control (RRC) parameters defined in some standards. While one of the SIM cards (e.g., 64A) is in the RRC_CONNECTED state, data may be transmitted between the electronic device 10 and one of the base stations 52. However, while this happens, the other SIM card (e.g., 64B) may not detect paging notifications. A paging notification may be a request for the electronic device 10 to communicatively couple to and communicate with the base station 52 that originated the paging notification. When the SIM cards 64 are both operating in the RRC_IDLE/RRC_INACTIVE state, either of the SIM cards 64 may detect a paging notification from one of the base stations 52.

Figure 8:
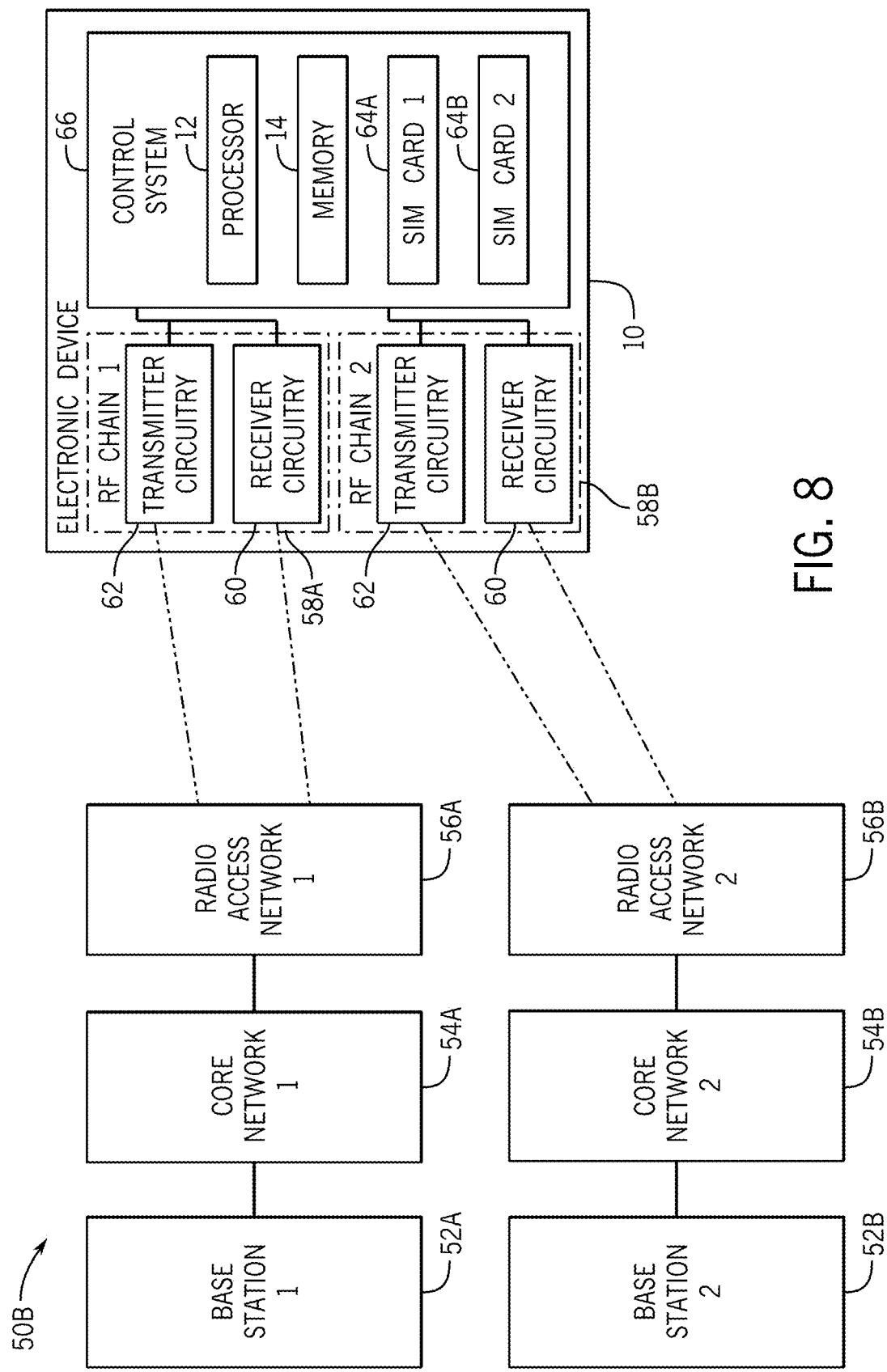
FIG. 8 is a block diagram of multiple base stations communicating with the electronic device of FIG. 1 that includes two RF chains, in accordance with an embodiment.

FIG. 7 depicts one RF chain 58. However, sometimes multiple RF chains 58 are included in the electronic device 10. It is noted that, in some embodiments, RF chains 58 may include multiple different receiver circuitries 60 (e.g., each corresponding to a respective SIM card 64) but share a transmitter circuitry 62. FIG. 8 is a block diagram of a second example communication system 50B that includes multiple base stations 52 communicating with an electronic device 10 that includes two RF chains 58, according to embodiments of the present disclosure. The various functional blocks shown in FIG. 8 may include hardware elements (including circuitry), software elements (including computer code stored on a computer-readable medium), or a combination of both hardware and software elements. It should also be noted that FIG. 8 is merely one example of a particular implementation and is intended to illustrate the types of components that may be present. As such, functional blocks may be added or omitted, and their arrangement within the second example communication system 50B may be modified.

Each RF chain 58 may correspond to a particular network provided by a particular base station 52, a particular core network 54, and/or a particular radio access network 56. The first core network 54A, the first base station 52A, and the first radio access network 56A may correspond to the first SIM card 64A and the first RF chain 58A. The second base station 52B, the second core network 54B, and the second radio access network 56B may correspond to the second SIM card 64B and the second RF chain 58B.

While some electronic devices may provide some functionality to operate multiple SIM cards 64 as described above, this does not guarantee suitable operation of the multiple SIM cards 64. In particular, sometimes these electronic devices may miss a paging notification transmitted for one of the SIM cards 64. As described above, another common problem is "device unavailability," which may affect an electronic device 10 when one of the SIM cards 64 has an active session since any other SIM cards 64 are unusable.

The presently described systems, devices, and methods may address these shortcomings and enable increased and more flexible usage of multiple SIM cards 64. In particular, as described herein, the manner in which paging notifications are issued may be adjusted to reduce or eliminate collisions. That is, a base station 52 (e.g., second base station 52B) may adjust a paging cycle assignment based on a paging cycle assignment of another base station 52 (e.g., first base station 52A) such that the issued paging notifications are non-conflicting transmissions (e.g., do not collide in the time domain). In particular, the paging cycle assignments may control when the first SIM card 64A and the second SIM card 64B are each operated on or off. In this way, the respective SIM cards 64 may be operated in a non-conflicting manner, such that more than base stations 52 are not attempting to communicate to the respective SIM card 64 at a time.

Figure 9:
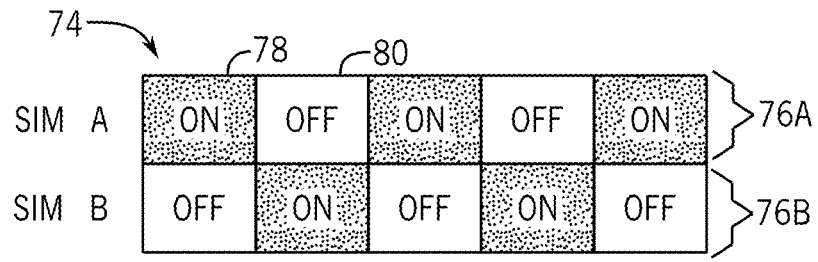
FIG. 9 is an example paging cycle diagram depicting a non-conflicting transmission pattern assigned to each of a first subscriber identification module (SIM) card and a second SIM card of the electronic device of FIG. 1, in accordance with an embodiment.

To help explain, FIG. 9 is an example paging cycle diagram 74 depicting a non-conflicting transmission pattern (e.g., row 76A, row 76B) assigned to each of the first SIM card 64A and a second SIM card 64B, according to embodiments of the present disclosure. Each SIM card 64 may be assigned a paging cycle via a paging cycle assignment. Each paging cycle may include alternating transmission periods 78 (e.g., "on" periods) and idle periods 80 (e.g., "off" periods). The RF chains 58 may receive data from the core networks 54 during the transmission period 78 (and operate one of the SIM cards 64 in the RRC_CONNECTED state), but may be idle and not able to receive data during the idle period 80 (and operate one of the SIM cards 64 in the RRC_IDLE/RRC_INACTIVE state). In some embodiments, when an RF chain 58 is idle and not in use (e.g., during the idle period 80, when the corresponding of the SIM cards 64 is in the RRC_IDLE/RRC_INACTIVE state), power may not be supplied to the RF chain 58 or power supplied to the RF chain 58 may be reduced, realizing power savings for the electronic device 10. It is noted that, in some cases, the idle periods 80 are generated in response to, coincide with, are contained within, or include connected discontinuous receive mode (C-DRX) gaps. The C-DRX gaps may signal to the electronic device 10 when to switch operating frequencies of the RF chain 58 to communicate with a different core network 54 during a transmission period 78. The C-DRX gaps may corresponding to idle periods 80 of a paging cycle assignment, and thus map be considered transmission gaps. When entering a respective idle period 80 of a first paging cycle assignment, if a second paging cycle assignment enters a transmission period 78, the electronic device 10 may switch between use of the first SIM card 64A and use of the second SIM card 64B. In some embodiments, when a paging cycle assignment is in an idle period 80, the electronic device 10 may reduce power supplied (e.g., relatively less power, zero power) to at least a portion of the RF chain 58 circuitry and/or the SIM card 64 assigned the paging cycle assignment.

When paging cycle assignments (e.g., corresponding to different SIM cards 64) conflict, communications between the electronic device 10 and the base stations 52 may be missed when an incoming transmission overlaps with a current ongoing transmission or reception operation of the electronic device 10. However, according to the present embodiments, a base station 52 may select a paging cycle assignment to organize conflicting transmission patterns into non-conflicting transmission patterns (e.g., by assigning the paging cycle to not overlap with another paging cycle assignment). When the electronic device 10 operates the SIM cards 64 in accordance with non-conflicting paging cycle assignments, the electronic device 10 reduces or eliminates a likelihood of missing data to be transmitted between a core network 54 and a corresponding SIM card 64 since a likelihood of conflicting transmission patterns is reduced or eliminated.

Thus, at least some of the presently disclosed embodiments are directed processes for determining the paging cycle assignments. The processes may apply to a variety of electronic devices, including electronic devices that have one RF chain 58 and electronic devices that have two or more RF chains 58 (as indicated by "No. RF Component Chain" of Table 1 below). Some processes may use communication and cooperation between core networks 54 (as indicated by "Direct Core Network Intercommunication" of Table 1), and thus between providers of the core networks 54, while some processes use the electronic device 10 to facilitate the transmission of information between the core networks 54. Furthermore, some processes use the radio access networks 56 to select a transmission band or transmission frequency (as indicated by "Radio Access Network Selecting Transmission Frequency" of Table 1). These processes may be combined to bring certain advantages to operation, as is described herein. Table 1 summarizes example combinations and may be useful to reference as discussion continues into FIG. 10 through FIG. 23.

TABLE 1

| Embodiment Number (No.) | No. RF Component Chain | Direct Core Network Intercommunication | Radio Access Network Selecting Transmission Frequency | Supported RRC States |
| --- | --- | --- | --- | --- |
| 1 | 1 | Yes | No | IDLE |
| 2 | 1 | No | No | IDLE |
| 3 | 2 | Yes | Yes | IDLE, CONNECTED |
| 4 | 2 | No | Yes | IDLE, CONNECTED |
| 5 | 1 | No | Yes | CONNECTED |

To summarize, in the first embodiment (e.g., Embodiment No. 1 from Table 1), a single RF chain 58 is used to switch between two transmission frequencies corresponding to two SIM cards 64. The core networks 54 exchange information related to the electronic device 10 to generate non-conflicting paging cycle assignments for the different SIM cards 64. In the first embodiment, the radio access networks 56 may not necessarily select a transmission frequency (unless the first embodiment is combined with the fifth embodiment), wherein the selected transmission frequency may enable communication using the second core network 54B without conflict with communications using the first core network 54A. Also, the first embodiment may be used when the SIM cards 64 are in an RRC_IDLE/RRC_INACTIVE state but not necessarily when the SIM cards 64 are in an RRC_CONNECTED state.

In the second embodiment (e.g., Embodiment No. 2 from Table 1), a single RF chain 58 is used to switch between two transmission frequencies corresponding to two SIM cards 64, and upon registration to the second core network 54B, the electronic device may indicate that it has an active first SIM card 64A and may provide the paging cycle assignment for the first SIM card 64A to the second base station 52B. The second core network 54B may generate a paging cycle assignment for the second SIM card 64B using the paging cycle assignment for the first SIM card 64A as to generate a non-conflicting paging cycle assignment for the second SIM card 64B. In this way, the second embodiment may not include core networks 54 that exchange information to generate non-conflicting paging cycle assignments for the different SIM cards 64 and the radio access networks 56 may not necessarily select a transmission frequency (unless the first embodiment is combined with the fifth embodiment). It is noted that the second embodiment may be used when the SIM cards 64 are in an RRC_IDLE/RRC_INACTIVE state but not necessarily when the SIM cards 64 are in an RRC_CONNECTED state.

In the third embodiment (e.g., Embodiment No. 3 from Table 1), two RF chains 58 are used to substantially simultaneously monitor two frequencies, and thus transmissions from two radio access networks 56. The electronic device 10 may indicate to both base stations 52 that it has multiple SIM cards 64 via the core networks 54. The electronic device 10 may use non-access stratum (NAS) signaling to indicate to the base stations 52 the multi-SIM capability of the electronic device 10, where the NAS is a functional layer between telecommunication protocol stacks of the core networks 54 and the electronic device 10. The electronic device 10 may also indicate to the base stations 52 preferred transmission bands or transmission frequencies. The radio access networks 56 may coordinate to redirect the electronic device 10 to either a first frequency or a second frequency that the electronic device 10 is able to monitor simultaneous based on the preferred transmission bands or transmission frequencies. The first frequency and the second frequency may be defined by hardware parameters of the RF chains 58 and/or SIM cards 64 of the electronic device 10 (e.g., a combination of circuitry of a RF chain 58 may set the first or second frequency). It is noted that in the third embodiment, the core networks 54 directly communicate (e.g., directly intercommunicate) with each other to determine non-conflicting paging cycle assignments, and the third embodiment supports both an RRC_IDLE/RRC_INACTIVE state and an RRC_CONNECTED state.

In the fourth embodiment (e.g., Embodiment No. 4 from Table 1), two RF chains 58 are used to substantially simultaneously monitor two frequencies, and thus transmissions from two radio access networks 56. The electronic device 10 may indicate to both base stations 52 that it has multiple SIM cards 64 via the radio access networks 56. The electronic device 10 may use access stratum (AS) signaling to indicate to the base stations 52 the multi-SIM capability of the electronic device 10, where the AS is a functional layer between telecommunication protocol stacks of the radio access networks 56 and the electronic device 10. The electronic device 10 may also indicate to the base stations 52 preferred transmission bands or transmission frequencies. The radio access networks 56 may coordinate to redirect the electronic device 10 to either a first frequency or a second frequency that the electronic device 10 is able to monitor simultaneous based on the preferred transmission bands or transmission frequencies. The first frequency and the second frequency, as well as the preferred transmission bands or transmission frequencies, may be defined by hardware parameters of the RF chains 58 and/or SIM cards 64 of the electronic device 10 (e.g., a combination of circuitry of a RF chain 58 may set the first or second frequency). It is noted that in the fourth embodiment, the core networks 54 do not communicate (e.g., directly intercommunicate) with each other to determine non-conflicting paging cycle assignments and instead use signals from the electronic device 10 to determine non-conflicting paging cycle assignments. The fourth embodiment supports both an RRC_IDLE/RRC_INACTIVE state and an RRC_CONNECTED state.

In the fifth embodiment (e.g., Embodiment No. 5 from Table 1), a single RF chain 58 is used to switch between two transmission frequencies corresponding to two SIM cards 64. The second radio access network 56B may generate transmission/reception gaps, such as connected mode DRX, for the second SIM card 64B using the paging cycle assignment for the first SIM card 64A as to generate non-conflicting reception opportunities. In this way, the second embodiment may not include core networks 54 that exchange information to generate non-conflicting paging cycle assignments for the different SIM cards 64. In the fifth embodiment, the radio access networks 56 may select a transmission frequency and may be used when the SIM cards 64 are in an RRC_CONNECTED state but not necessarily when the SIM cards 64 are in an RRC_IDLE/RRC_INACTIVE state.

Certain combinations of the above examples may be useful too. For example, the second example and the fourth example may co-exist and co-manage the electronic device 10. In this way, the core networks 54 may operate to generate non-conflicting paging cycle assignments while the radio access networks 56 may operate to select transmission bands or transmission frequencies in accordance with preferences of the electronic device 10. The fifth example and the fourth example may also be combined if for any reason an electronic device 10 is unable to listen simultaneously to a particular transmission frequency combination. When determining combinations of the examples, care may be taken to combine operations that supports both an "IDLE" state (e.g., RRC_IDLE state and/or RRC_INACTIVE state of SIM card 64) and a "CONNECTED" state (e.g., RRC_CONNECTED state of SIM card 64). This may be shown in the last column of the Table 1 (e.g., "Supported States"). For example, the second example may have a relatively low architectural impact but may be combined with the fifth example to support each of the SIM cards 64 operational states. It is noted that if the electronic device 10 has two RF chains 58, the fourth example may have the least architectural impact of the five examples and may support each operational state of the SIM cards 64. Other combinations include the first example and the fifth example, and/or the second example and the fifth example. With the forgoing in mind, the discussion now turns to more detailed description of the five examples described in Table 1.

Embodiment No. 1: One RF Chain with Core Network Intercommunication

Figure 10:
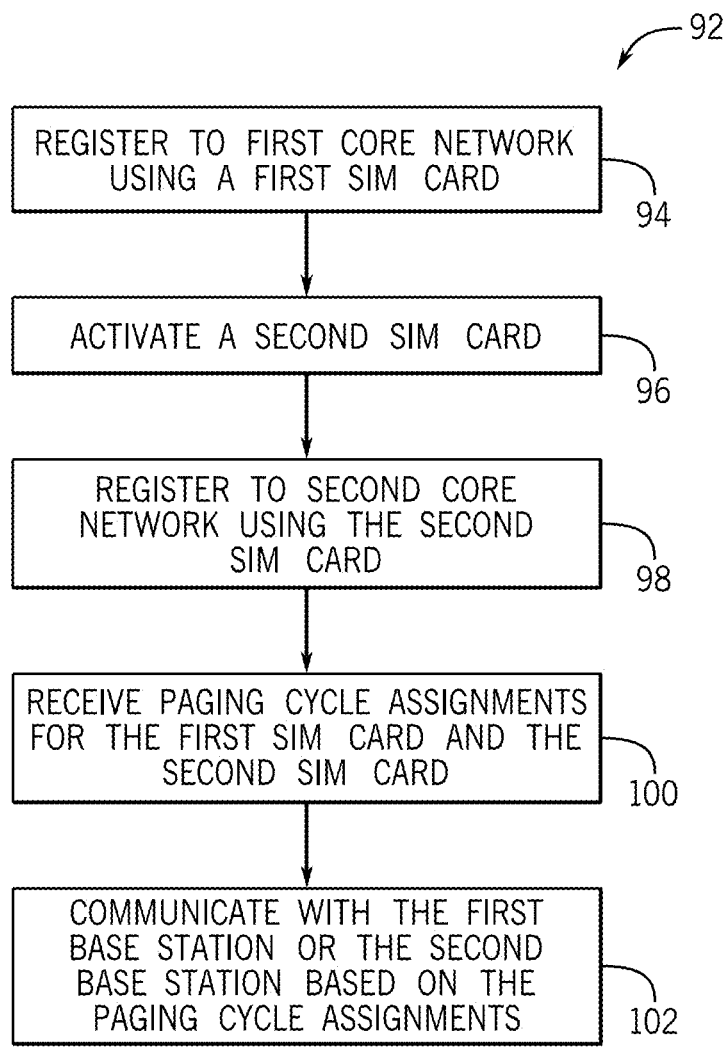
FIG. 10 is a flow chart illustrating a method for operating the electronic device of FIG. 1 to communicate with the first base station and the second base station of FIG. 7 or FIG. 8 as part of a first example multi-SIM operation, in accordance with an embodiment.
Figure 11:
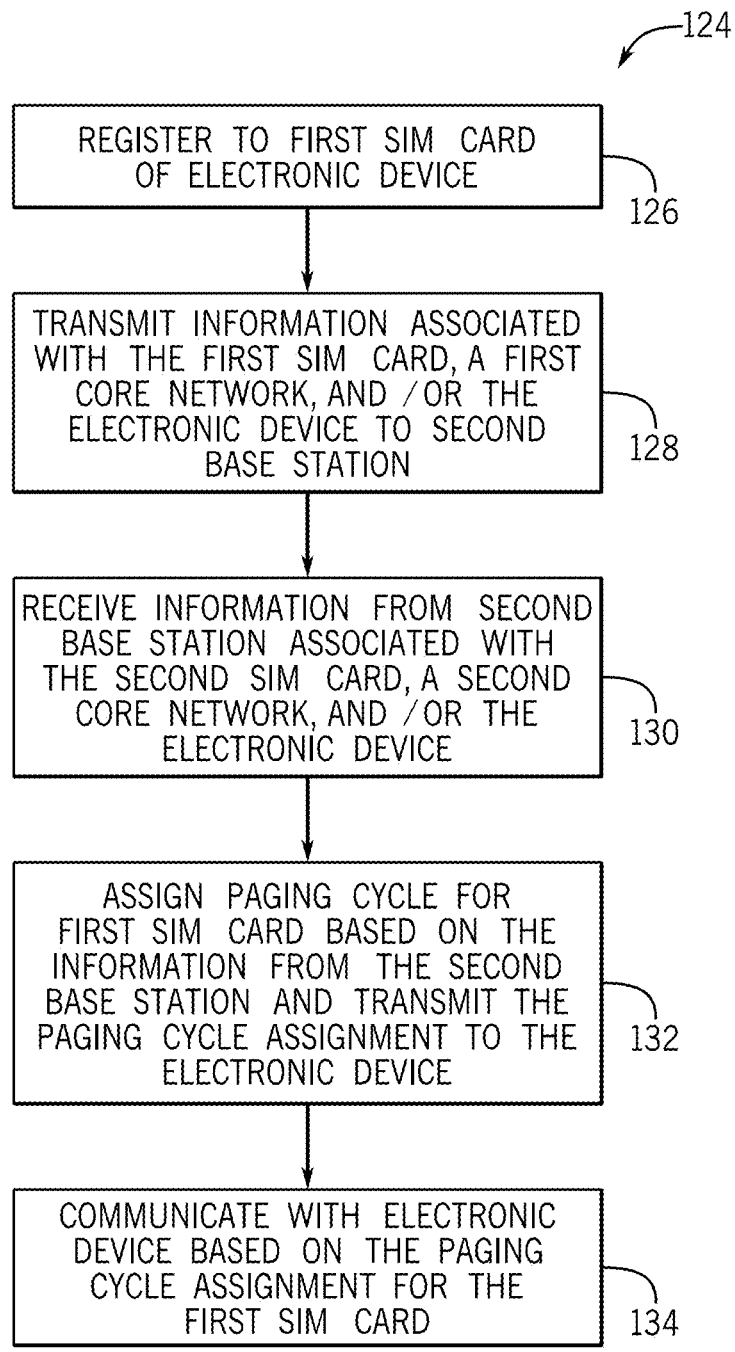
FIG. 11 is a flow chart illustrating a method for operating the first base station of FIG. 7 or FIG. 8 to communicate with the electronic device of FIG. 1 and the second base station of FIG. 7 or FIG. 8 as part of the first example multi-SIM operation, in accordance with an embodiment.
Figure 12:
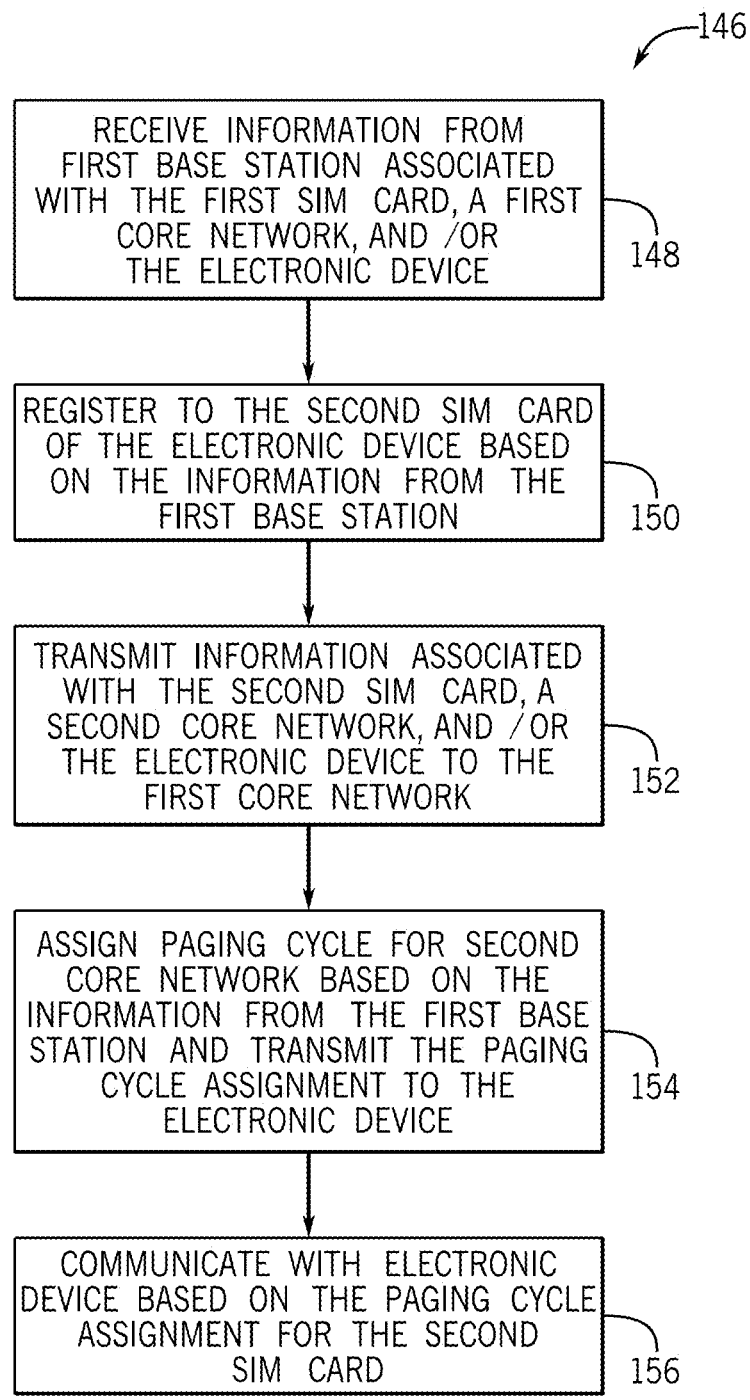
FIG. 12 is a flow chart illustrating a method for operating the second base station of FIG. 7 or FIG. 8 to communicate with the electronic device of FIG. 1 and the first base station of FIG. 7 or FIG. 8 as part of the first example multi-SIM operation, in accordance with an embodiment.

FIG. 10, FIG. 11, and FIG. 12 describe processes that use intercommunication between the core networks 54 to enable paging cycle assignment and registration to the SIM cards 64. Turning now to FIG. 10, a flow chart illustrates a method 92 for operating the electronic device 10 to communicate with the first base station 52A and the second core network 54B as part of a first example multi-SIM operation (e.g., Embodiment No. 1 from Table 1). In the case when the electronic device 10 is not able to listen substantially simultaneously to two or more frequencies (or frequency bands) at the same time, the method 92 may be used to tune between a first transmission frequency corresponding to the first core network 54A and a second transmission frequency corresponding to the second core network 54B. In this first example, the core networks 54 exchange information related to the electronic device 10 and generate paging cycle assignments that do not overlap (e.g., conflict) in the time domain. In this way, conflicting transmission or reception durations are reduced and/or eliminated. Thus, it may be said that the burden of generating non-conflicting paging cycle assignments is on the core networks 54 for the first example multi-SIM operation (e.g., Embodiment No. 1 from Table 1).

In some embodiments, the method 92 may be implemented at least in part by executing instructions stored in a tangible, non-transitory, computer-readable medium, such as the memory 14, using processing circuitry, such as processors 12, or the like. However, as described herein, the method 92 is described as being performed by the electronic device 10. It is noted that although depicted and/or described in a particular order, many operations described herein may be performed in any suitable order, and some operations may be skipped altogether.

Keeping this in mind, at block 94, the electronic device 10 may register to the first core network 54A using the first SIM card 64A to register to the first base station 52A. To do so, the electronic device 10 may obtain an identity number, such as an IMSI, from the first SIM card 64A, and may transmit the identity number to the first core network 54A. Transmitting the identity number from the first SIM card 64A enables the electronic device 10 to request access and authentication to the first base station 52A. In some embodiments, the electronic device 10 may pass an additional identity number, such as a personal identification number (PIN), to the first SIM card 64A before the first SIM card 64A reveals the identity number to the electronic device 10. The first base station 52A may search the memory 14 to determine an encryption key corresponding to the identity number of the first SIM card 64A. The electronic device 10 may use the encryption key to encrypt and/or decrypt future communications with the first base station 52A. Registering to the first base station 52A may permit the electronic device 10 access to information transmitted via the first core network 54A and/or the first radio access network 56A. This process may be repeated for registration to the second core network 54B.

At block 96, the electronic device 10 may activate the second SIM card 64B and, at block 98, may register to the second core network 54B using the second SIM card 64B to register to the second base station 52B. Activating the second SIM card 64B may permit the electronic device 10 to retrieve the identity number from the second SIM card 64B for use in registration with the second base station 52B. Similar to the first base station 52A at block 94, the second core network 54B may determine an authentication key to use in encryption and/or decryption operations with the electronic device 10. In some embodiments, some credentials of the first base station 52A are shared with the second base station 52B to permit the second SIM card 64B and the electronic device 10 access to information transmitted via the second core network 54B and/or the second radio access network 56B.

At block 100, the electronic device 10 may receive the respective paging cycle assignments for the first SIM card 64A corresponding to the first core network 54A and for the second SIM card 64B corresponding to the second core network 54B. The electronic device 10 may receive the paging cycle assignments after the electronic device 10 registers with the second base station 52B. As described further with respect to FIG. 11 and/or FIG. 12, the paging cycle assignment for the first core network 54A is determined based on the paging cycle assignment for the second core network 54B, and vice versa, for the first example multi-SIM operation (e.g., Embodiment No. 1 from Table 1). For each example of Table 1, the paging cycle assignments may be communicated between components of the communication networks 50 by indication of a period or by implementation of a single frequency network (SFN). If using a single frequency network, scanning operations may be performed by the electronic device 10 to determine a frequency and/or gain direction to use when communicating with the core network 54. The scanning operations may determine the frequency and/or gain direction based on relative signal strengths detected during the scanning. In some embodiments, the electronic device 10 may initially communicate with the core networks 54 according to an initial and/or a default paging cycle assignment until the electronic device 10 receives the paging cycle assignments from the first base station 52A and/or the second base station 52B.

In response to receiving the page cycle assignments, the electronic device 10, at block 102, may communicate with the first base station 52A or with the second base station 52B based at least in part on the paging cycle assignment. Communication with the first base station 52A may include sending authentication or encryption data stored on the first SIM card 64A (e.g., one or more keys to use in decrypting or encrypting of data exchanged between the electronic device 10 and the first base station 52A), similar to how communication with the second base station 52B may include sending data stored on the second SIM card 64B. In this way, the electronic device 10 may communicate with the first base station 52A using the paging cycle assignment attributed to the first SIM card 64A and communicate with the second base station 52B using the paging cycle assignment attributed to the second SIM card 64B as a way to reduce or eliminate a likelihood of conflicting data transmissions (e.g., reducing occurrences of paging cycle overlap) between the electronic device 10 and the second core network 54B.

To elaborate on how the first base station 52A may interact with the electronic device 10 and/or the second base station 52B, FIG. 11 is a flow chart illustrating a method 124 for operating the first base station 52A to communicate with the electronic device 10 and the second base station 52B as part of the first example multi-SIM operation (e.g., Embodiment No. 1 from Table 1). In some embodiments, the method 124 may be implemented at least in part by executing instructions stored in a tangible, non-transitory, computer-readable medium, such as the memory 14, using processing circuitry, such as processors 12, or the like. However, as described herein, the method 124 is described as being performed by the first base station 52A. It is noted that although depicted and/or described in a particular order, many operations described herein may be performed in any suitable order, and some operations may be skipped altogether.

At block 126, the first base station 52A may register to the first SIM card 64A of the electronic device 10. Similar to operations described at block 94 of method 92 (e.g., FIG. 10), the registration process includes verifying identity and permission of the first SIM card 64A to confirm that the electronic device 10 is authorized to access data of the first core network 54A and/or the first base station 52A. The first base station 52A may authenticate the first SIM card 64A using one or more keys transmitted from the first SIM card 64A. The first base station 52A may use the keys to verify that the electronic device 10 has an authority to access data of the first core network 54A. Registering to the first base station 52A may permit the electronic device 10 access to information transmitted via the first core network 54A.

When the first base station 52A is registered to the first SIM card 64A, at block 128, the first base station 52A may transmit information associated with the first SIM card 64A, first core network 54A and/or the electronic device 10 to the second base station 52B. For example, the first base station 52A may transmit paging cycle preferences to the second base station 52B. The second base station 52B may use the paging cycle assignment of the first core network 54A when assigning a paging cycle to the second core network 54B, such as to determine a non-conflicting paging cycle assignment relative to the paging cycle preferences of the first core network 54A.

At block 130, the first base station 52A may receive information associated with the second SIM card 64B, the second core network 54B, and/or the electronic device 10 from the second base station 52B. The information from the second base station 52B may include paging cycle preferences for data sent via the second core network 54B. The first base station 52A may consider the preferences from the second base station 52B when determining a paging cycle to use to communicate with the electronic device 10 via the first core network 54A.

Thus, at block 132, the first base station 52A may assign a paging cycle for the first SIM card 64A corresponding to the first core network 54A based on the information from the second base station 52B, and may transmit the paging cycle assignment to the electronic device 10. After the electronic device 10 implements the paging cycle assignment for the first core network 54A, the first base station 52A may, at block 134, communicate with the electronic device 10 using the first core network 54A according to the paging cycle assignment.

To elaborate on how the second base station 52B may interact with the electronic device 10 and/or the first base station 52A, FIG. 12 is a flow chart illustrating a method 146 for operating the second base station 52B to communicate with the electronic device 10 and the first base station 52A as part of the first example multi-SIM operation (e.g., Embodiment No. 1 from Table 1). In some embodiments, the method 146 may be implemented at least in part by executing instructions stored in a tangible, non-transitory, computer-readable medium, such as the memory 14, using processing circuitry, such as processors 12, or the like. However, as described herein, the method 146 is described as being performed by the second base station 52B. It is noted that although depicted and/or described in a particular order, many operations described herein may be performed in any suitable order, and some operations may be skipped altogether.

At block 148, the second base station 52B may receive information from the first base station 52A associated with the first SIM card 64A, the first core network 54A, and/or the electronic device 10. The information from the first base station 52A may include credentials of the first SIM card 64A to verify permission of the electronic device 10 to communicate with the second core network 54B.

At block 150, the second base station 52B may register the second SIM card 64B of the electronic device 10. Similar to operations described at block 98 of method 92 (e.g., FIG. 10), the registration process includes verifying identity and permission of the second SIM card 64B to confirm that the electronic device 10 is authorized to access data of the second core network 54B and/or the second base station 52B. To register to the second SIM card 64B, the second core network 54B may authenticate the second SIM card 64B using one or more keys from the second SIM card 64B and transmitted by the electronic device 10. The second core network 54B may use the keys to verify that the electronic device 10 has an authority to access data of the second core network 54B. Registering to the second base station 52B may permit the electronic device 10 access to information transmitted via the second core network 54B. The second base station 52B may reference information from the first base station 52A (e.g., credential of the first SIM card 64A) when registering the second SIM card 64B. It is noted that each example described herein may authenticate the second SIM card 64B based on one or more credentials or information associated with the first SIM card 64A.

At block 152, the second base station 52B may transmit information associated with the second SIM card 64B, the second core network 54B, and/or the electronic device 10 to the first base station 52A. The information from the second base station 52B may include paging cycle preferences for the second core network 54B. As described above with respect to block 132 of method 124 (e.g., FIG. 11), at block 154, the first base station 52A may use the paging cycle preferences for the second core network 54B to determine a non-conflicting paging cycle assignment for the first core network 54A to use when communicating with the electronic device 10. After assignment, the second base station 52B may transmit the paging cycle assignment to the electronic device 10. After the electronic device 10 implements the paging cycle assignment for the second core network 54B, the second base station 52B may, at block 156, communicate with the electronic device 10 using the second core network 54B according to the paging cycle assignment.

Embodiment No. 2: One RF Chain without Core Network Intercommunication

Figure 13:
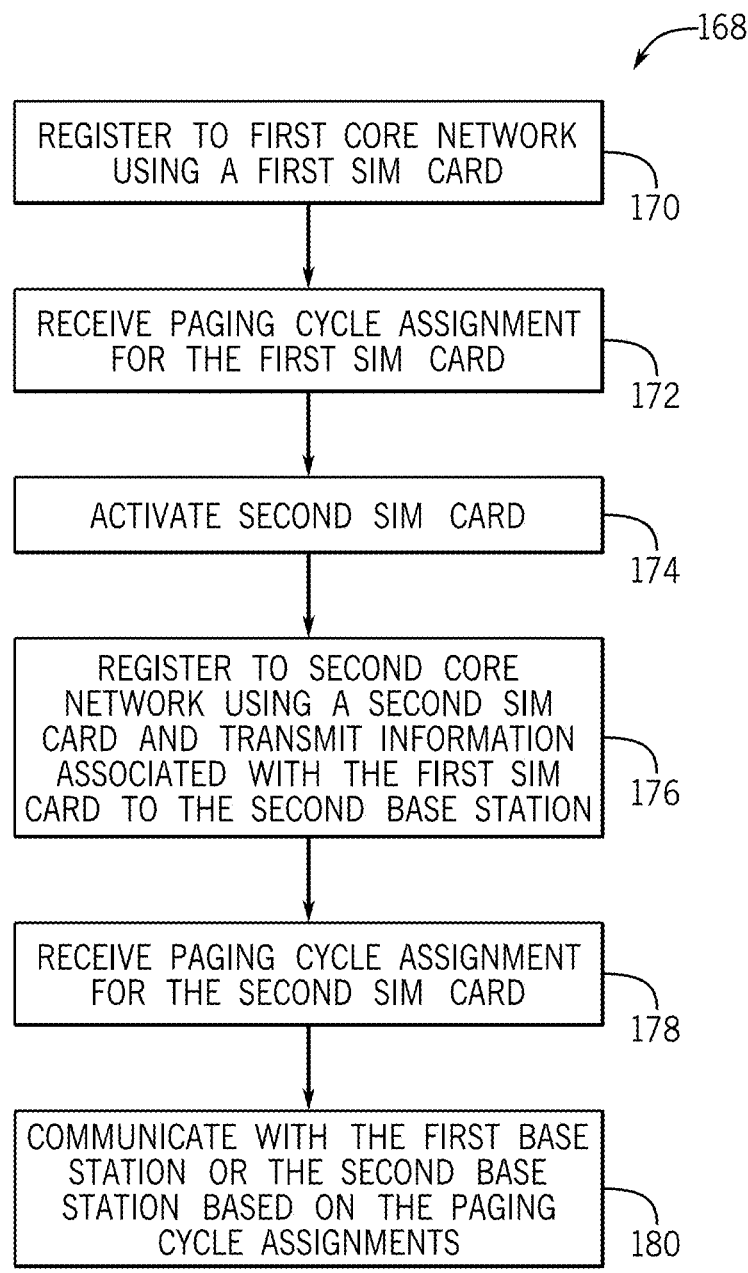
FIG. 13 is a flow chart illustrating a method for operating the electronic device of FIG. 1 to communicate with the first base station and the second base station of FIG. 7 or FIG. 8 as part of a second example multi-SIM operation, in accordance with an embodiment.
Figure 14:
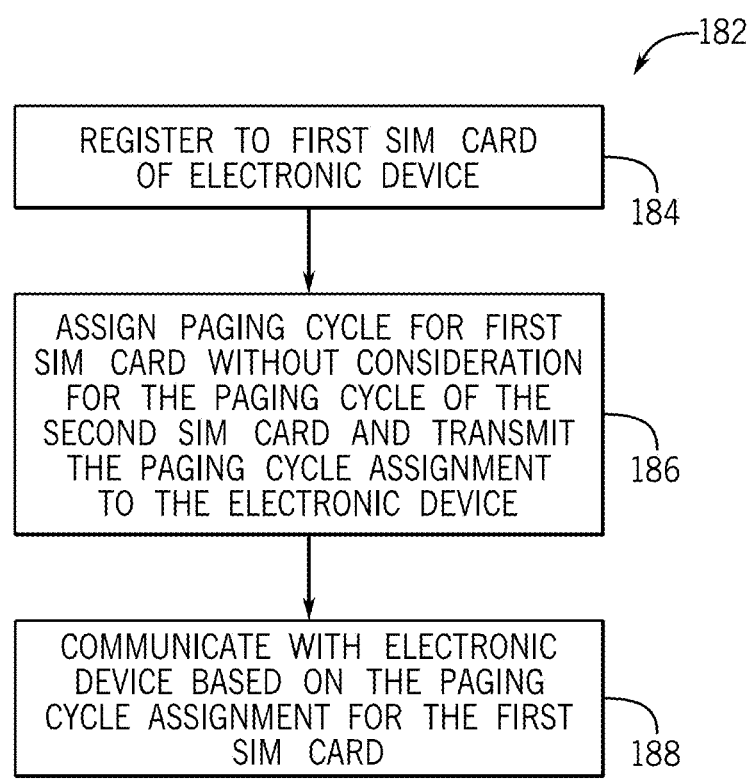
FIG. 14 is a flow chart illustrating a method for operating the first base station of FIG. 7 or FIG. 8 to communicate with the electronic device of FIG. 1 as part of the second example multi-SIM operation, in accordance with an embodiment.
Figure 15:
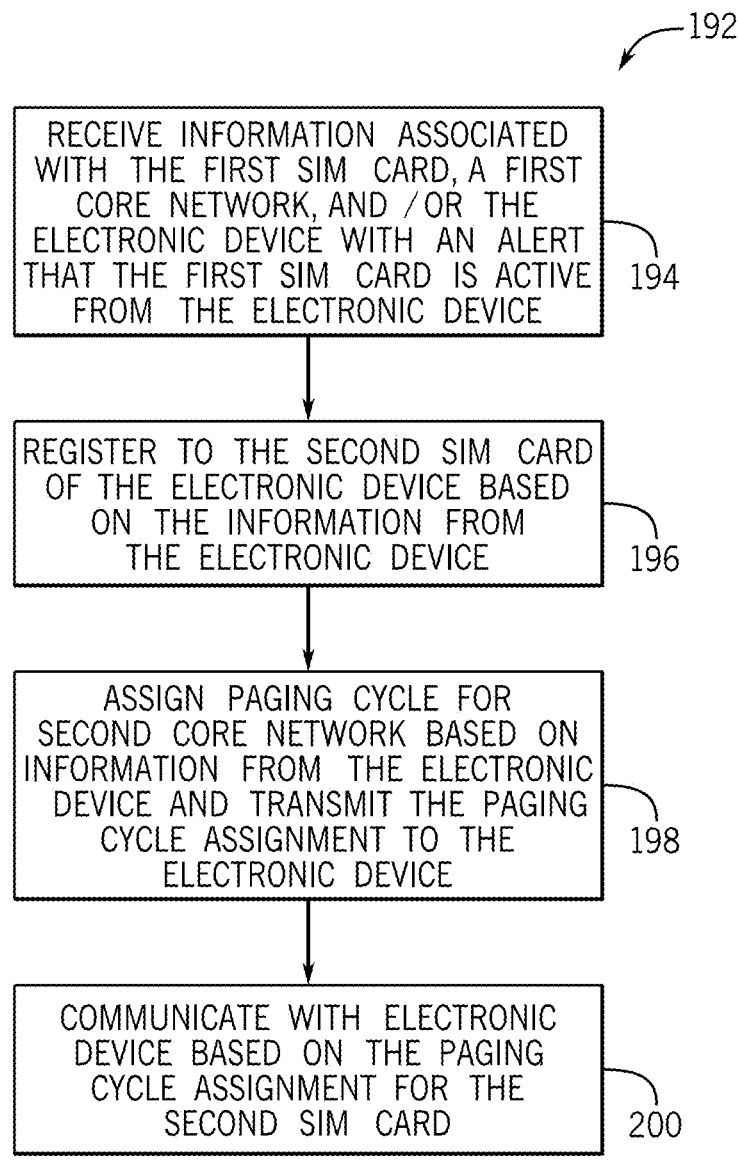
FIG. 15 is a flow chart illustrating a method for operating the second base station of FIG. 7 or FIG. 8 to communicate with the electronic device of FIG. 1 as part of a second example multi-SIM operation, in accordance with an embodiment.

FIG. 13, FIG. 14, and FIG. 15 describe processes that use the electronic device 10 as a communicative mediator between the core networks 54 to enable assignment of non-conflicting paging cycles without using direct intercommunication between the core networks 54. Turning now to FIG. 13, a flow chart illustrates a method 168 for operating the electronic device 10 to communicate with the first base station 52A and the second core network 54B as part of a second example multi-SIM operation (e.g., Embodiment No. 2 from Table 1). In the case when the electronic device 10 is not able to listen substantially simultaneously to two or more frequencies, the method 168 may be used to tune between a first transmission frequency corresponding to the first SIM card 64A and a second transmission frequency corresponding to the second SIM card 64B. In this second example, the electronic device 10 facilitates exchange of information related to the first base station 52A to the second core network which generates the paging cycle assignment for the second core network 54B based on the page cycle assignment for the first base station 52A. In this way, conflicting transmission or reception durations are reduced and/or eliminated. Thus, it may be said that the burden of generating non-conflicting paging cycle assignments is on the second core network 54B for the second example multi-SIM operation (e.g., Embodiment No. 2 from Table 1). It is noted that although depicted and/or described in a particular order, many operations described herein may be performed in any suitable order, and some operations may be skipped altogether.

In some embodiments, the method 168 may be implemented at least in part by executing instructions stored in a tangible, non-transitory, computer-readable medium, such as the memory 14, using processing circuitry, such as processors 12, or the like. However, as described herein, the method 168 is described as being performed by the electronic device 10.

At block 170, the electronic device 10 may register to the first core network 54A using the first SIM card 64A to register to the first base station 52A. Operations performed at block 94 of FIG. 10 may be performed at block 170 of FIG. 13, and thus are incorporated herein. Registering to the first base station 52A may permit the electronic device 10 access to information transmitted via the first core network 54A and/or the first radio access network 56A.

At block 172, the electronic device 10 may receive the paging cycle assignment for the first SIM card 64A corresponding to the first core network 54A from the first base station 52A. In response to the first base station 52A registering the first SIM card 64A, the first base station 52A may determine the paging cycle assignment corresponding to the first core network 54A without consideration for the paging cycle assignment of the second core network 54B.

At block 174, the electronic device 10 may activate the second SIM card 64B and, at block 176, may register to the second core network 54B using the second SIM card 64B to register to the second base station 52B. Operations performed at block 96 and at block 98 of FIG. 10 may be performed at block 174 and block 176 of FIG. 13, and thus are incorporated herein. Registering to the second base station 52B may permit the electronic device 10 access to information transmitted via the second core network 54B and/or the second radio access network 56B. Furthermore, at block 174, the electronic device 10 may transmit the paging cycle assignment associated with the first SIM card 64A and corresponding to the first core network 54A to the second base station 52B. In this way, the electronic device 10 may facilitate information exchange between the base stations 52 without the base stations 52 directly communicating. The second base station 52B may determine a paging cycle assignment for the second SIM card 64B based on the paging cycle assignment associated with the first SIM card 64A.

After the second base station 52B determines the paging cycle assignment for the second SIM card 64B, at block 178, the electronic device 10 may receive the paging cycle assignment for the second SIM card 64B from the second base station 52B. Using the paging cycle assignment for the first SIM card 64A and the paging cycle assignment for the second SIM card 64B, the electronic device 10 may, at block 180, communicate with the first base station 52A or the second base station 52B. Because the paging cycle assignment for the second SIM card 64B is generated based on the paging cycle assignment for the first SIM card 64A, the paging cycles used by the electronic device 10 to communicate with each core network 54 may be non-conflicting and reduce or eliminate a likelihood of conflicting transmission patterns happening.

To elaborate on how the first base station 52A may interact with the electronic device 10, FIG. 14 is a flow chart illustrating a method 182 for operating the first base station 52A to communicate with the electronic device 10 and the second base station 52B as part of the second example multi-SIM operation (e.g., Embodiment No. 2 from Table 1). In some embodiments, the method 182 may be implemented at least in part by executing instructions stored in a tangible, non-transitory, computer-readable medium, such as the memory 14, using processing circuitry, such as processors 12, or the like. However, as described herein, the method 182 is described as being performed by the first base station 52A. It is noted that although depicted and/or described in a particular order, many operations described herein may be performed in any suitable order, and some operations may be skipped altogether.

At block 184, the first base station 52A may register to the first SIM card 64A of the electronic device 10. Operations performed at block 126 of FIG. 11 may be performed at block 184 of FIG. 14, and thus are incorporated herein. Registering to the first base station 52A may permit the electronic device 10 access to information transmitted via the first core network 54A and/or the first radio access network 56A.

At block 186, the first base station 52A may assign a paging cycle for the first SIM card 64A corresponding the first core network 54A without consideration for the paging cycle of the second SIM card 64B corresponding to the second core network 54B and may transmit the paging cycle assignment to the electronic device 10. In this way, the first base station 52A may use a default or otherwise defined paging cycle for the first SIM card 64A. Thus, the burden of establishing a non-conflicting paging cycle is on the second base station 52B. Once the paging cycle is established for the first core network 54A for use by the electronic device 10, at block 188, the first base station 52A may communicate with the electronic device 10 using the first core network 54A according to the paging cycle assignment.

To elaborate on how the second base station 52B may interact with the electronic device 10, FIG. 15 is a flow chart illustrating a method 192 for operating the second base station 52B to communicate with the electronic device 10 and the first base station 52A as part of the second example multi-SIM operation (e.g., Embodiment No. 2 from Table 1). In some embodiments, the method 192 may be implemented at least in part by executing instructions stored in a tangible, non-transitory, computer-readable medium, such as the memory 14, using processing circuitry, such as processors 12, or the like. However, as described herein, the method 192 is described as being performed by the second core network 54B. It is noted that although depicted and/or described in a particular order, many operations described herein may be performed in any suitable order, and some operations may be skipped altogether.

At block 194, the second base station 52B may receive information associated with the first SIM card 64A, the first core network 54A, and/or the electronic device 10 from the electronic device. The second base station 52B may also receive an alert that the first SIM card 64A is active. The information associated with the first core network 54A includes the paging cycle assignment for the first SIM card 64A. In some embodiments, the information includes credentials of the first SIM card 64A to be used in authenticating the second SIM card 64B.

At block 196, the second base station 52B may register to the second SIM card 64B based on information from the electronic device 10. To register the second SIM card 64B, the second base station 52B may authenticate the second SIM card 64B using one or more keys from the second SIM card 64B and transmitted by the electronic device 10. The second core network 54B may use the keys to verify that the electronic device 10 has an authority to access data of the second core network 54B. In some embodiments, the second base station 52B may also use credentials from the first SIM card 64A when authenticating the second SIM card 64B. Registering to the second base station 52B may permit the electronic device 10 access to information transmitted via the second core network 54B.

Using the paging cycle assignment received at block 194, the second base station 52B, at block 198, may assign a paging cycle for the second SIM card 64B corresponding to the second core network 54B. The second base station 52B may assign a paging cycle to the second core network 54B that does not conflict with the paging cycle assignment of the first SIM card 64A corresponding to the first core network 54A. The second base station 52B may determine a non-conflicting paging cycle assignment without direct communication with the first base station 52A. In some embodiments, the second base station 52B may assign a non-conflicting paging cycle assignment to the second SIM card 64B by applying an offset to the paging cycle assignment of the first SIM card 64A (e.g., an offset in time). The second base station 52B may also transmit the paging cycle assignment for the second SIM card 64B to the electronic device 10. Using the non-conflicting paging cycle assignment, at block 200, the second base station 52B may communicate with the electronic device 10 without interrupting communications between the first base station 52A and the electronic device 10.

Embodiment No. 3: Two RF Chains with Core Network Intercommunication and Radio Access Network Frequency Selection FIG. 16, FIG. 17, and FIG. 18 describe processes that use direct communication between the core networks 54 to enable paging cycle assignment and registration to the SIM cards 64, but further include operations that enable the electronic device 10 to indicate communication preferences (e.g., transmission band, transmission frequency) to the second base station 52B to cause the second base station to redirect its communications to the electronic device 10, such as to not conflict with other operations of the electronic device 10 and/or the first base station 52A.

Figure 16:
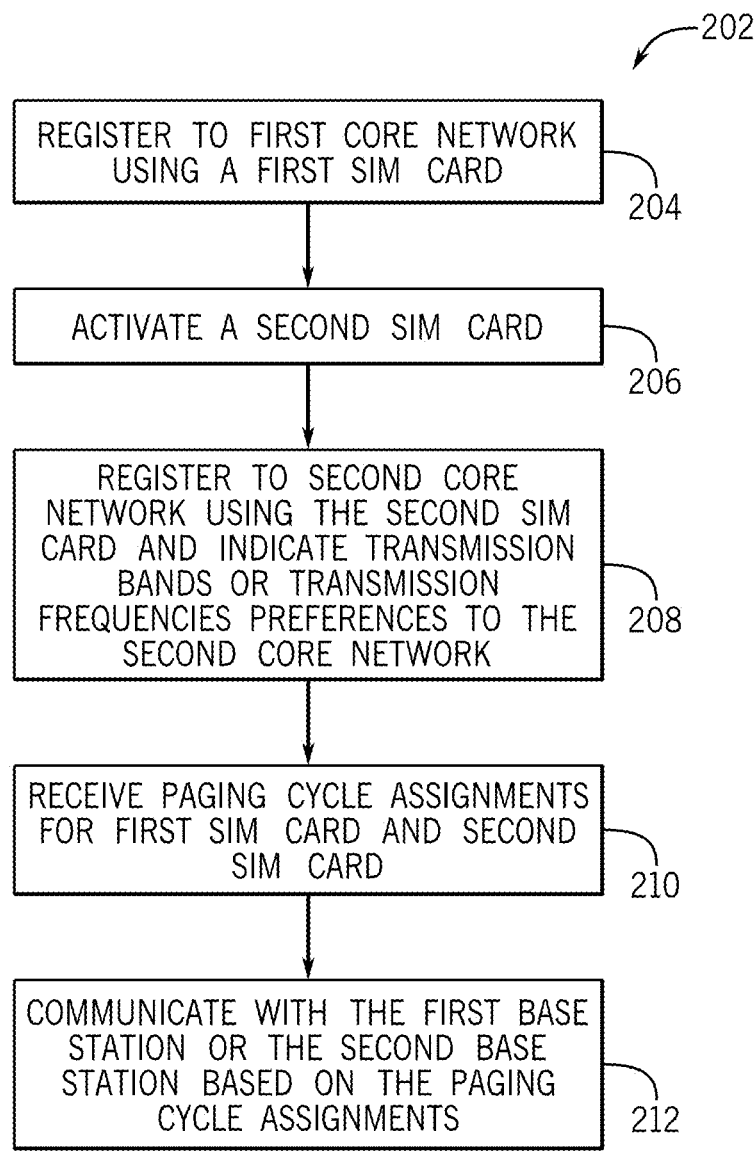
FIG. 16 is a flow chart illustrating a method for operating the electronic device of FIG. 1 to communicate with the first base station and the second base station of FIG. 7 or FIG. 8 as part of a third example multi-SIM operation, in accordance with an embodiment.

Turning now to FIG. 16, a flow chart illustrates a method 202 for operating the electronic device 10 to communicate with the first base station 52A and the second base station 52B as part of a third example multi-SIM operation (e.g., Embodiment No. 3 from Table 1). In the case when the electronic device 10 is able to listen substantially simultaneously to two or more frequencies, the method 202 may be used to tune between a first transmission frequency corresponding to the first core network 54A and a second transmission frequency corresponding to the second core network 54B. In this third example, the base stations 52 exchange information related to the electronic device 10, including frequency preferences, and generate paging cycle assignments that do not overlap (e.g., conflict) in the time domain. In this way, conflicting transmission or reception durations are reduced and/or eliminated. Thus, it may be said that the burden of generating non-conflicting paging cycle assignments is on both of the base stations 52 for the third example multi-SIM operation (e.g., Embodiment No. 3 from Table 1).

In some embodiments, the method 202 may be implemented at least in part by executing instructions stored in a tangible, non-transitory, computer-readable medium, such as the memory 14, using processing circuitry, such as processors 12, or the like. However, as described herein, the method 202 is described as being performed by the electronic device 10. It is noted that although depicted and/or described in a particular order, many operations described herein may be performed in any suitable order, and some operations may be skipped altogether.

At block 204, the electronic device 10 may register to the first core network 54A using the first SIM card 64A to register to the first base station 52A and, at block 206, the electronic device 10 may activate the second SIM card 64B. Operations performed at block 94 and block 96 of FIG. 10 may be performed at block 204 and block 206 of FIG. 16, and thus are incorporated herein. The first base station 52A may authenticate the first SIM card 64A using one or more keys from the first SIM card 64A and transmitted by the electronic device 10. The first base station 52A may use the keys to verify that the electronic device 10 has an authority to access data of the first core network 54A. Registering to the first base station 52A may permit the first SIM card 64A and the electronic device 10 access to information transmitted via the first core network 54A.

At block 208, the electronic device 10 may register to the second core network 54B using the second SIM card 64B, and may indicate one or more transmission bands or transmission frequencies preferences of the electronic device 10 to the second base station 52B. The electronic device 10 may also indicate to the second core network 54B that it includes multiple SIM cards 64. The second base station 52B may authenticate the second SIM card 64B using one or more keys from the second SIM card 64B and transmitted by the electronic device 10. The second base station 52B may use the keys to verify that the electronic device 10 has an authority to access data of the second core network 54B. Registering to the second base station 52B may permit the electronic device 10 access to information transmitted via the second core network 54B and/or the second radio access network 56B. When the electronic device 10 transmits the transmission bands or transmission frequencies preferences, the electronic device 10 generates and send a set of preferred transmission bands and/or preferred transmission frequencies that the second base station 52B may use when determining the transmission band or transmission frequency to use to communicate with the electronic device 10. The electronic device 10 may exclude transmission bands or transmission frequencies that conflict with an operation of the electronic device 10, are unsupported by the electronic device 10 and/or an operation of the first core network 54A, or otherwise may conflict with a transmission from the electronic device 10. Furthermore, the electronic device 10 may know the transmission band or transmission frequency of the first core network 54A after registering to the first core network 54A. In this way, the electronic device 10 may additionally or alternatively indicate the transmission band or the transmission frequency of the first core network 54A to the second base station 52B such that the second base station 52B may not assign a conflicting transmission band or transmission frequency.

At block 210, the electronic device 10 may receive the paging cycle assignment for the first SIM card 64A corresponding to the first core network 54A and may receive the paging cycle assignment for the second SIM card 64B corresponding to the second core network 54B. The electronic device 10 may receive the paging cycle assignment corresponding to the first core network 54A from the first base station 52A before or after (or substantially simultaneous to) receiving the paging cycle assignment corresponding to the second core network 54B from the second base station 52B. At block 212, the electronic device 10 may use the paging cycle assignments to communicate with the first base station 52A and/or the second base station 52B. Operations performed at block 102 of FIG. 10 may be performed at block 212 of FIG. 16, and thus are incorporated herein.

Figure 17:
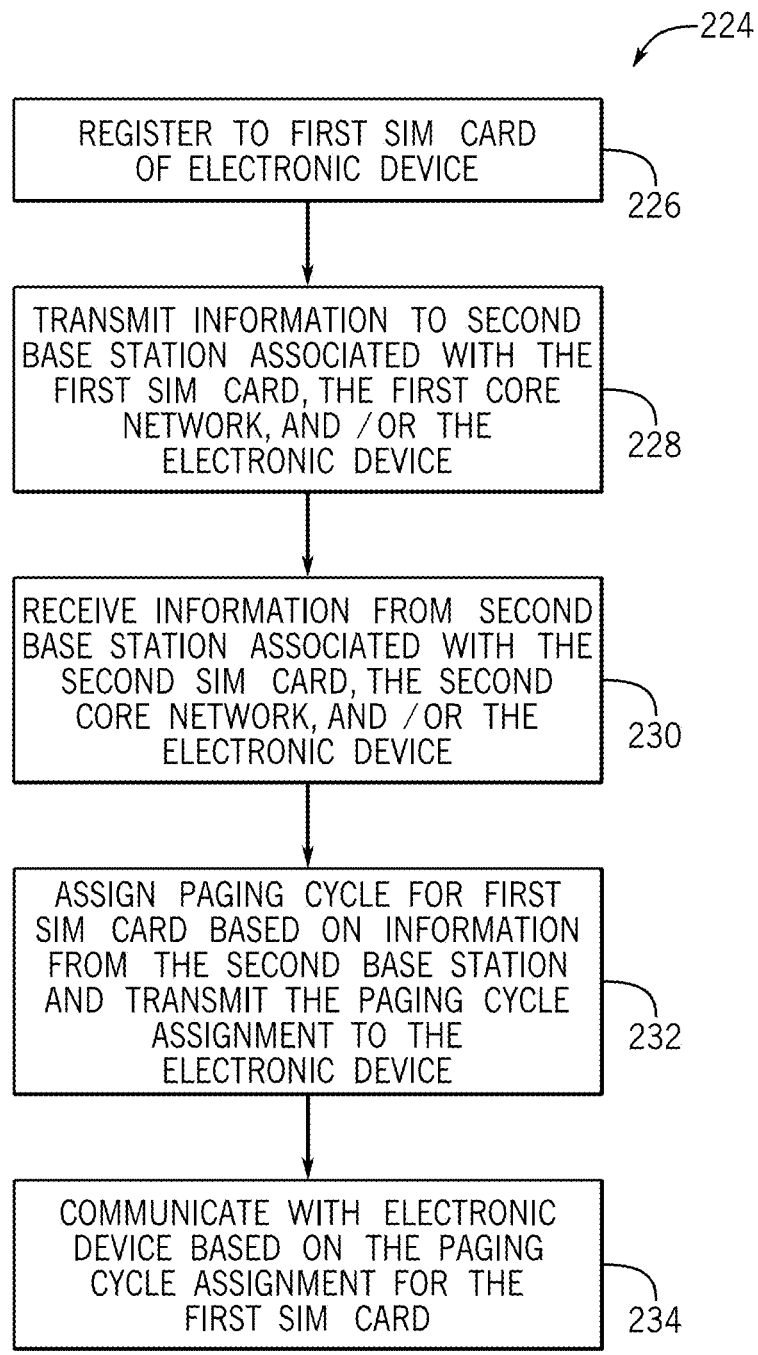
FIG. 17 is a flow chart illustrating a method for operating the first base station of FIG. 7 or FIG. 8 to communicate with the electronic device of FIG. 1 and the second base station of FIG. 7 or FIG. 8 as part of the third example multi-SIM operation, in accordance with an embodiment.

To elaborate on how the first base station 52A may interact with the electronic device 10 and/or the second base station 52B, FIG. 17 is a flow chart illustrating a method 224 for operating the first base station 52A to communicate with the electronic device 10 and the second core network 54B as part of the third example multi-SIM operation (e.g., Embodiment No. 3 from Table 1). In some embodiments, the method 224 may be implemented at least in part by executing instructions stored in a tangible, non-transitory, computer-readable medium, such as the memory 14, using processing circuitry, such as processors 12, or the like. However, as described herein, the method 224 is described as being performed by the first base station 52A. It is noted that although depicted and/or described in a particular order, many operations described herein may be performed in any suitable order, and some operations may be skipped altogether.

At block 226, the first base station 52A may register to the first SIM card 64A of the electronic device 10. At block 228, the first base station 52A may transmit information associated with the first SIM card 64A, first core network 54A, and/or the electronic device 10 to the second base station 52B. At block 230, the first base station 52A may receive information associated with the second SIM card 64B, the second core network 54B, and/or the electronic device 10 from the second base station 52B. Finally, at block 232, the first base station 52A may assign a paging cycle for the first core network 54A based on the information from the second base station 52B, and may transmit the paging cycle assignment for the first SIM card 64A to the electronic device 10. After the electronic device 10 implements the paging cycle assignment for the first core network 54A, the first base station 52A may, at block 234, communicate with the electronic device 10 using the first core network 54A and/or the first radio access network 56A.

Figure 18:
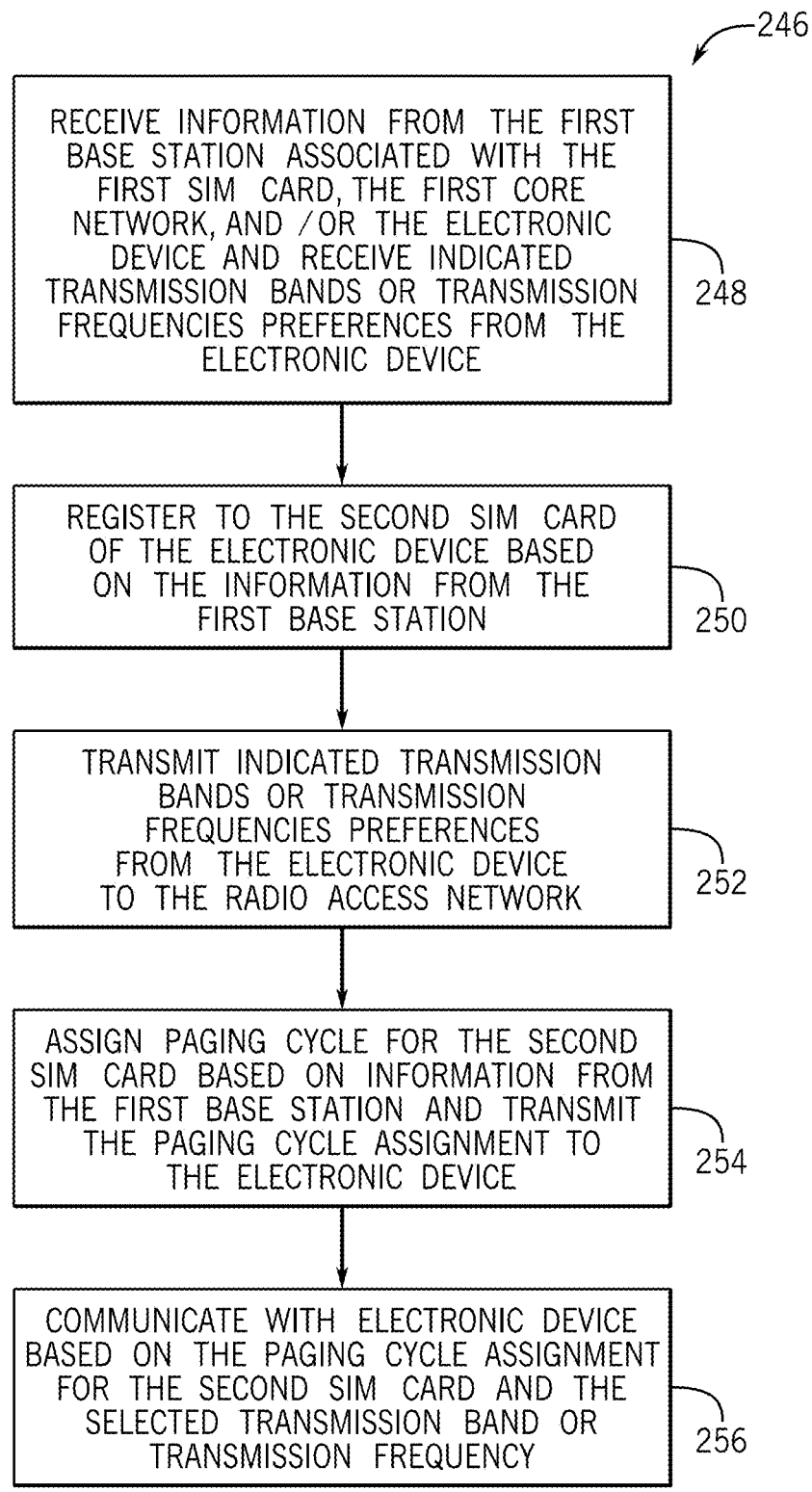
FIG. 18 is a flow chart illustrating a method for operating the second base station of FIG. 7 or FIG. 8 to communicate with the electronic device of FIG. 1 and the first base station of FIG. 7 or FIG. 8 as part of the third example multi-SIM operation, in accordance with an embodiment.

To elaborate on how the second core network 54B may interact with the electronic device 10 and/or the first base station 52A, FIG. 18 is a flow chart illustrating a method 246 for operating the second core network 54B to communicate with the electronic device 10 and the first base station 52A as part of the third example multi-SIM operation (e.g., Embodiment No. 3 from Table 1). In some embodiments, the method 246 may be implemented at least in part by executing instructions stored in a tangible, non-transitory, computer-readable medium, such as the memory 14, using processing circuitry, such as processors 12, or the like. However, as described herein, the method 246 is described as being performed by the second core network 54B. It is noted that although depicted and/or described in a particular order, many operations described herein may be performed in any suitable order, and some operations may be skipped altogether.

At block 248, the second base station 52B may receive information from the first base station 52A associated with the first SIM card 64A, the first core network 54A, and/or the electronic device 10, and may receive transmission bands or transmission frequencies preferences from the electronic device 10. The information from the first base station 52A may include credentials of the first SIM card 64A to verify permission of the electronic device 10 to communicate with the second core network 54B. The indicated band or frequency preferences may be used by the second base station to determine a transmission band or a transmission frequency compatible with the preferences of the electronic device 10 (e.g., non-conflicting with other operations or the first core network 54A).

At block 250, the second base station 52B may register the second SIM card 64B of the electronic device 10. The second base station 52B may reference information from the first base station 52A (e.g., credential of the first SIM card 64A) when registering the second SIM card 64B. Operations performed of block 250 (of FIG. 18) are the same as operations of block 150 of method 146 (e.g., FIG. 12), and are thus incorporated herein.

At block 252, the second base station 52B may transmit the transmission bands or transmission frequencies preferences of the electronic device 10 to the radio access network 56B for use in selecting a transmission band or transmission frequency. The radio access network 56B may redirect the transmission frequency or the transmission band of the second base station 52B to accommodate one of the indicated band or frequency preferences of the electronic device 10. In this way, the second base station 52B may transmit the transmission bands or transmission frequencies preferences as one or more control signals to the radio access network 56B. When the electronic device 10 indicates the transmission band or transmission frequency preferences, the electronic device 10 may generate a set of transmission bands and/or transmission frequencies that the second base station 52B and/or radio access network 56B may use when determining the transmission band or transmission frequency to use to communicate with the electronic device 10. The second base station 52B and/or the radio access network 56B then may select non-conflicting transmission bands or transmission frequencies based on the indicated transmission bands or transmission frequencies preferences.

At block 254, the second base station 52B may assign a paging cycle for the second SIM card 64B corresponding to the second core network 54B, and may transmit the paging cycle assignment to the electronic device 10. Operations performed of block 254 (of FIG. 18) are the same as operations of block 154 of method 146 (e.g., FIG. 12), and are thus incorporated herein. After the electronic device 10 implements the paging cycle assignment, at block 256, the second base station 52B may communicate with the electronic device 10 using the second core network 54B and/or the radio access network 56B based on the paging cycle assignment and using the selected transmission band or transmission frequency. In this way, the second base station 52B may transmit data to or receive data from the electronic device 10 during a transmission period 78 assigned via the paging cycle assignment for the second core network 54B. In some embodiments, the electronic device 10 may receive an indication of the selected transmission band or transmission frequency from the second base station 52B and/or may calibrate to the selected transmission band or transmission frequency before communicating with the second base station 52B. In some cases, the electronic device 10 may not reference an indication of the selected transmission band or transmission frequency when calibrating to the selected transmission band or transmission frequency.

Embodiment No. 4: Two RF Chains with Radio Access Network Frequency Selection and without Core Network Intercommunication Similar to FIG. 13, FIG. 14, and FIG. 15, which describe processes that use the electronic device 10 as a communicative mediator between the core networks 54 to enable assignment of non-conflicting paging cycles without using direct intercommunication between the core networks 54, FIG. 19, FIG. 20, and FIG. 21 describe processes that enable the electronic device 10 to indicate communication preferences (e.g., transmission band, transmission frequency) to the second base station 52B to cause the second base station to redirect its communications to the electronic device 10, such as not to conflict with other operations of the electronic device 10 and/or the first base station 52A.

Figure 19:
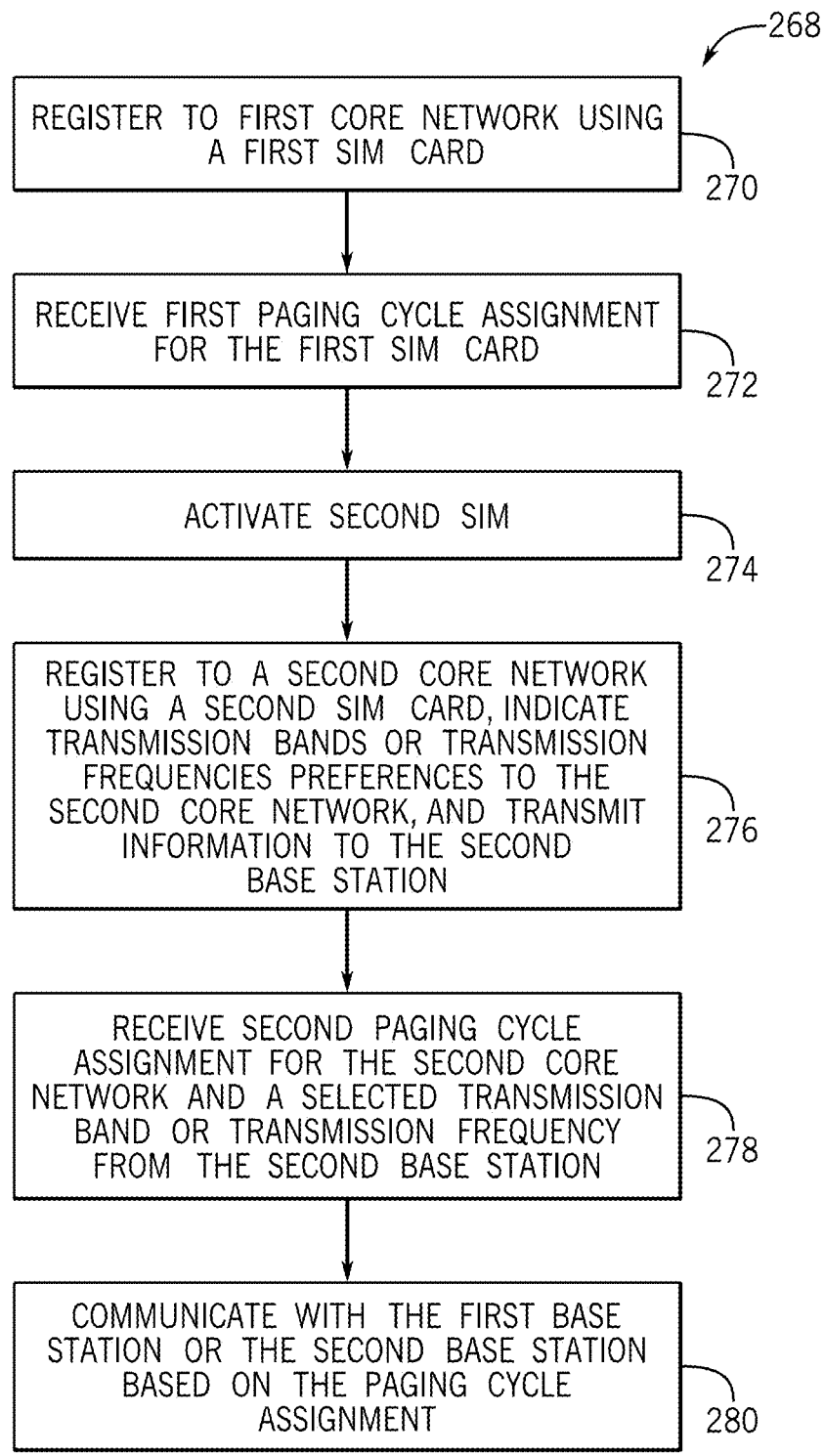
FIG. 19 is a flow chart illustrating a method for operating the electronic device of FIG. 1 to communicate with the first base station and the second base station of FIG. 7 or FIG. 8 as part of a fourth example multi-SIM operation, in accordance with an embodiment.

Turning now to FIG. 19, a flow chart illustrates a method 268 for operating the electronic device 10 to communicate with the first base station 52A and the second core network 54B as part of a fourth example multi-SIM operation (e.g., Embodiment No. 2 from Table 1). In the case when the electronic device 10 is able to listen substantially simultaneously to two or more frequencies, the method 268 may be used to tune between a first transmission frequency corresponding to the first core network 54A and a second transmission frequency corresponding to the second core network 54B. In this fourth example, the electronic device 10 facilities exchange of information related to the first base station 52A and/or the first core network 54A to the second base station 52B. The information may include frequency preferences and may enable the second core network 54B to generate paging cycle assignments that do not overlap (e.g., conflict) in the time domain with the page cycle assignment for the first core network 54A. In this way, conflicting transmission or reception durations are reduced and/or eliminated. Thus, it may be said that the burden of generating non-conflicting paging cycle assignments is on the second core network 54B for the fourth example multi-SIM operation (e.g., Embodiment No. 4 from Table 1).

In some embodiments, the method 268 may be implemented at least in part by executing instructions stored in a tangible, non-transitory, computer-readable medium, such as the memory 14, using processing circuitry, such as processors 12, or the like. However, as described herein, the method 268 is described as being performed by the electronic device 10. It is noted that although depicted and/or described in a particular order, many operations described herein may be performed in any suitable order, and some operations may be skipped altogether.

At block 270, the electronic device 10 may register to the first core network 54A using the first SIM card 64A to register to the first base station 52A. The electronic device 10 may, at block 272, receive the paging cycle assignment for the first SIM card 64A corresponding to the first core network 54A from the first base station 52A. At block 270, the electronic device 10 may activate the second SIM card 64B. Operations performed at block 170, block 172, and block 174 of FIG. 13 may be performed at block 270, block 272, and block 274 of FIG. 19, and thus are incorporated herein.

At block 276, the electronic device 10 may register to the second core network 54B using with the second SIM card 64B, and may indicate one or more transmission bands or transmission frequencies preferences to the second base station 52B. Operations performed at block 208 of FIG. 16 may be performed at block 276 of FIG. 19, and thus are incorporated herein. Also, at block 276, the electronic device 10 may transmit information associated with the first SIM card 64A, the first core network 54A, and/or the electronic device 10 to the second base station 52B, such as a paging cycle assignment for the first SIM card 64A (e.g., received at block 272). The information may include credentials of the first SIM card 64A which the second base station 52B may reference when registering the second SIM card 64B. It is noted that although not explicitly described as a part of each example process, each example process described herein may authenticate the second SIM card 64B based on one or more credentials or information associated with the first SIM card 64A.

At block 278, the electronic device 10 may receive the paging cycle assignment for the second SIM card 64B corresponding to the second core network 54B from the second base station 52B. Operations performed at block 178 of FIG. 13 may be performed at block 278 of FIG. 19, and thus are incorporated herein. At block 278, the electronic device 10 may also receive the selected transmission band or transmission frequency. Additionally or alternatively, the electronic device 10 may automatically tune or calibrate to a detected transmission band or transmission frequency of the second base station 52B corresponding to the selected transmission band or transmission frequency, such as part of a sweeping operation.

At block 280, the electronic device 10 may communicate with the first base station 52A or the second base station 52B based on the paging cycle assignment. Operations performed at block 180 of FIG. 13 may be performed at block 280 of FIG. 19, and thus are incorporated herein. The second base station 52B may communicate with electronic device 10 over the second core network 54B and/or the radio access network 56B using the selected transmission band or transmission frequency. The first base station 52A may communicate with the electronic device 10 over the first core network 54A and/or the radio access network 56A using a default or otherwise determined transmission band or transmission frequency. In this way, the burden of accommodating transmission preferences of the first base station 52A and/or the electronic device 10 is on the second base station 52B.

Figure 20:
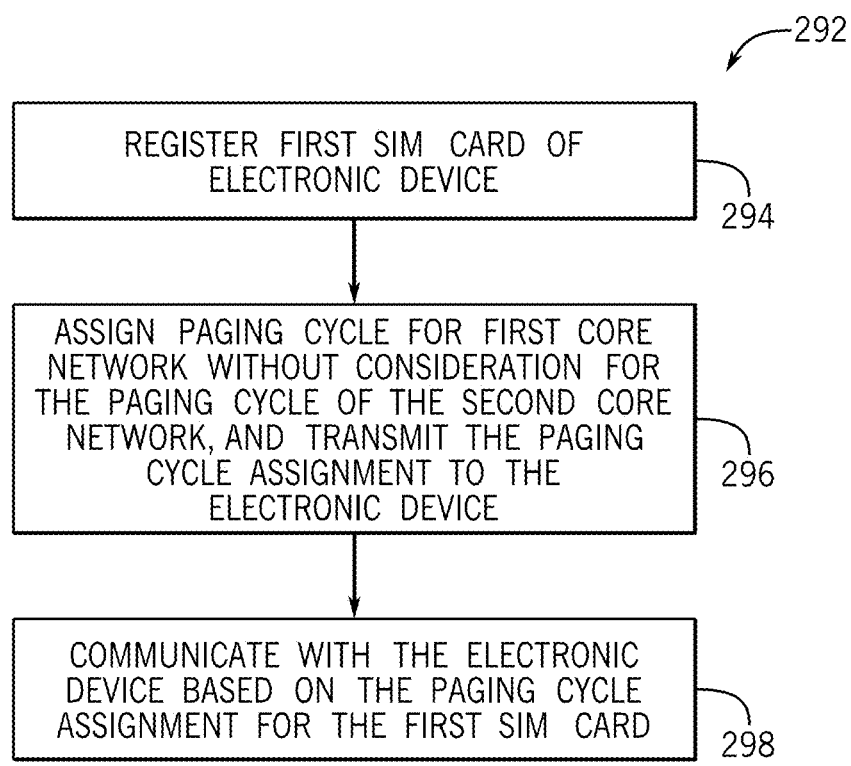
FIG. 20 is a flow chart illustrating a method for operating the first base station of FIG. 7 or FIG. 8 to communicate with the electronic device of FIG. 1 as part of the fourth example multi-SIM operation, in accordance with an embodiment.

To elaborate on how the first base station 52A may interact with the electronic device 10, FIG. 20 is a flow chart illustrating a method 292 for operating the first base station 52A to communicate with the electronic device 10 and the second core network 54B as part of the fourth example multi-SIM operation (e.g., Embodiment No. 4 from Table 1). In some embodiments, the method 292 may be implemented at least in part by executing instructions stored in a tangible, non-transitory, computer-readable medium, such as the memory 14, using processing circuitry, such as processors 12, or the like. However, as described herein, the method 292 is described as being performed by the first base station 52A. It is noted that although depicted and/or described in a particular order, many operations described herein may be performed in any suitable order, and some operations may be skipped altogether.

At block 294, the first base station 52A may register to the first SIM card 64A of the electronic device 10. At block 296, the first base station 52A may assign a paging cycle for the first SIM card 64A corresponding to the first core network 54A without consideration for the paging cycle for the second SIM card 64B corresponding to the second core network 54B. Also, at block 296, the first base station 52A may transmit the paging cycle assignment for the first SIM card 64A to the electronic device 10. Finally, at block 298, in response to the electronic device 10 implementing the paging cycle of the first SIM card 64A, the first core network 54A may communicate with the electronic device 10 based on the paging cycle assignment for the first SIM card 64A. Operations performed at block 184, block 186, and block 188 of FIG. 14 may be performed at block 294, block 296, and block 298 of FIG. 19, and thus are incorporated herein.

Figure 21:
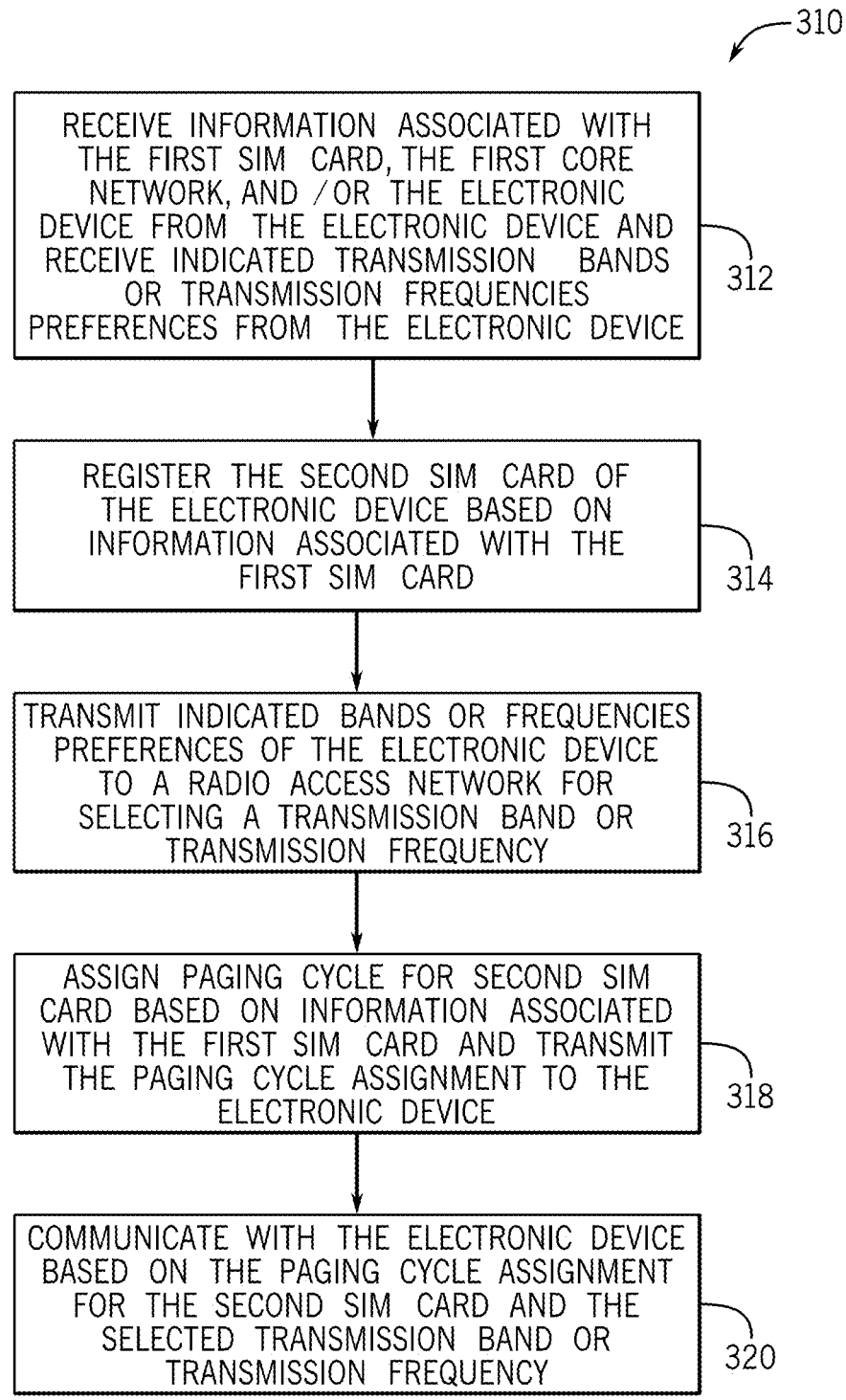
FIG. 21 is a flow chart illustrating a method for operating the second base station of FIG. 7 or FIG. 8 to communicate with the electronic device of FIG. 1 as part of the fourth example multi-SIM operation, in accordance with an embodiment.
Figure 22:
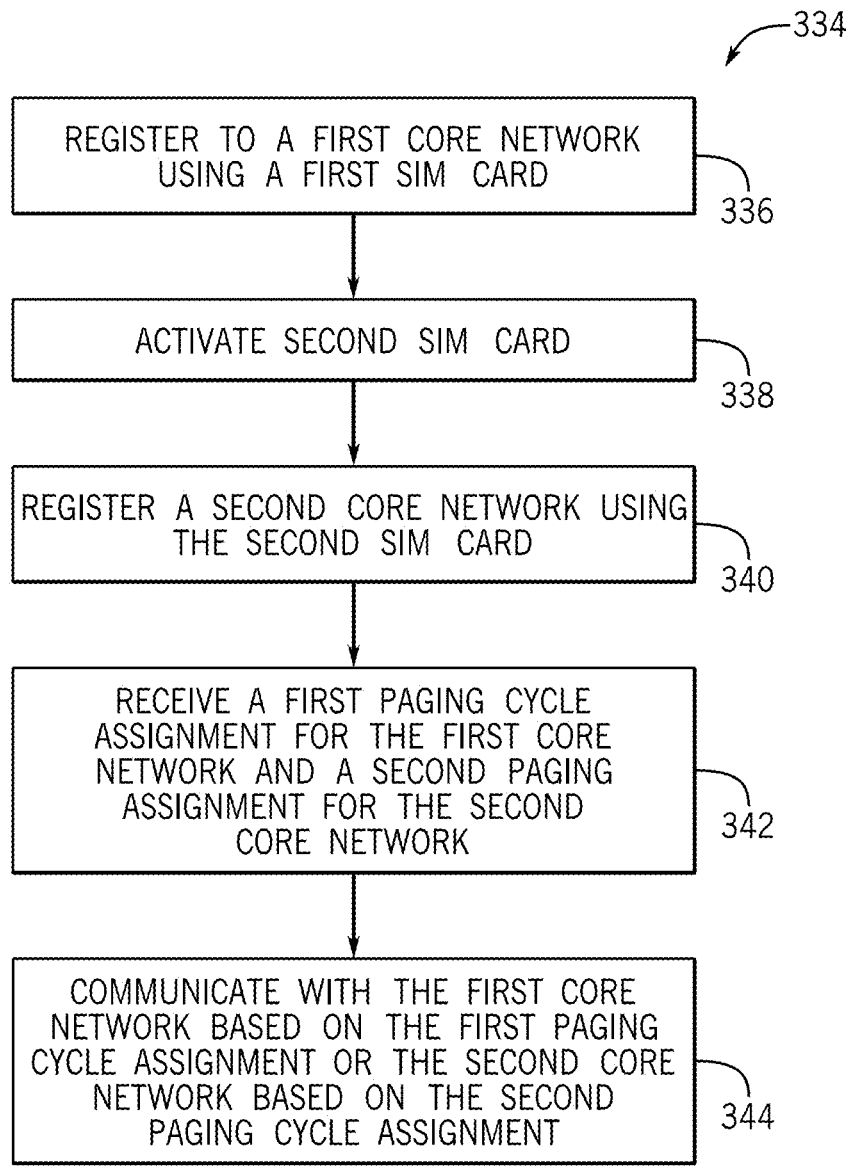
FIG. 22 is a flow chart illustrating a method for operating the electronic device of FIG. 1 to communicate with the first base station and the second base station of FIG. 7 or FIG. 8 as part of a fifth example multi-SIM operation, in accordance with an embodiment.

To elaborate on how the second core network 54B may interact with the electronic device 10, FIG. 21 is a flow chart illustrating a method 310 for operating the second core network 54B to communicate with the electronic device 10 and the first base station 52A as part of the fourth example multi-SIM operation (e.g., Embodiment No. 4 from Table 1). In some embodiments, the method 310 may be implemented at least in part by executing instructions stored in a tangible, non-transitory, computer-readable medium, such as the memory 14, using processing circuitry, such as processors 12, or the like. However, as described herein, the method 310 is described as being performed by the second core network 54B. It is noted that although depicted and/or described in a particular order, many operations described herein may be performed in any suitable order, and some operations may be skipped altogether.

At block 312, the second base station 52B may receive information associated with the first SIM card 64A, the first core network 54A, and/or the electronic device 10 from the electronic device 10, such as a paging cycle assignment for the first SIM card 64A. The information from the electronic device 10 may also include credentials of the first SIM card 64A to verify permission of the electronic device 10 to communicate with the second core network 54B. Also, at block 312, the second base station 52B may receive indicated transmission bands or transmission frequencies preferences from the electronic device 10. The indicated band or frequency preferences may be used by the second base station 52B to determine a transmission band or a transmission frequency compatible with the preferences of the electronic device 10 (e.g., non-conflicting with other operations or the first core network 54A).

At block 314, the second base station 52B may register the second SIM card 64B based on the information associated with the first SIM card 64A and received from the electronic device (e.g., credentials of the first SIM card 64A). At block 316, the second base station 52B may transmit the transmission bands or transmission frequencies preferences of the electronic device 10 to the radio access network 56B for selecting a transmission band or transmission frequency. At block 318, the second base station 52B may assign a paging cycle for the second SIM card 64B based on information associated with the first SIM card 64A (e.g., paging cycle assignment for the first SIM card 64A) and may transmit the paging cycle assignment for the second SIM card 64B to the electronic device 10. At block 320, the second base station may communicate with the electronic device 10 based on the paging cycle assignment for the second SIM card 64B and the selected transmission band or transmission frequency. Operations performed at block 250, block 252, block 254, and block 256 of FIG. 18 may be performed at block 314, block 316, block 318, and block 320 of FIG. 21, and thus are incorporated herein.

Embodiment No. 5: One RF Chain with Radio Access Network Frequency Selection and Without Core Network Intercommunication Turning now to FIG. 22, a flow chart illustrates a method 334 for operating the electronic device 10 to communicate with the first base station 52A and the second core network 54B as part of a fifth example multi-SIM operation (e.g., Embodiment No. 5 from Table 1) that may be used in combination with the first example and the second examples (e.g., Embodiment No. 1 and Embodiment No. 2 from Table 1). In the case when the electronic device 10 is not able to listen substantially simultaneously to two or more frequencies, the method 334 may be used to tune between a first transmission frequency corresponding to the first SIM card 64A and a second transmission frequency corresponding to the second SIM card 64B. In this first example, the radio access networks 56 may generate transmission/reception gaps to the electronic device 10 that do not overlap (e.g., conflict) in the time domain, providing suitable time for the electronic device 10 to change the RF component chain between the first transmission frequency and the second transmission frequency. In some embodiments, the method 334 may be implemented at least in part by executing instructions stored in a tangible, non-transitory, computer-readable medium, such as the memory 14, using processing circuitry, such as processors 12, or the like. However, as described herein, the method 334 is described as being performed by the electronic device 10. It is noted that although depicted and/or described in a particular order, many operations described herein may be performed in any suitable order, and some operations may be skipped altogether.

At block 336, the electronic device 10 may register to the first core network 54A using the first SIM card 64A. Operations performed at block 94 of FIG. 10 may be performed at block 336 of FIG. 22, and thus are incorporated herein. At block 338, the electronic device 10 may activate the second SIM card 64B and, at block 340, may register to the second core network 54B using the second SIM card 64B. Operations performed at block 96 and block 98 of FIG. 10 may be performed at block 338 and block 340 of FIG. 22, and thus are incorporated herein.

At block 342, the electronic device 10 may receive the respective paging cycle assignments for the first SIM card 64A and the second SIM card 64B. In some cases, the electronic device 10 may receive both of the paging cycle assignments after the electronic device 10 registers with the second base station 52B. However, in some embodiments, the electronic device 10 receives the paging cycle assignment for the first SIM card 64A before the electronic device 10 registers with the second base station 52B. The electronic device 10 may initially communicate with the core networks 54 according to an initial and/or a default paging cycle assignment until the electronic device 10 receives the paging cycle assignments from the first base station 52A and/or the second base station 52B. In some embodiments, the second base station 52B may generate the paging cycle assignment for the second SIM card 64B corresponding to the second core network 54B based on information transmitted directly to the second base station 52B by the first base station 52A (e.g., following operations of Embodiment No. 1). However, in some embodiments, the second base station 52B may generate the paging cycle assignment for the second core network 54B based on information transmitted to the second base station 52B by the electronic device 10 (e.g., following operations of Embodiment No. 2). The electronic device 10 may, at block 344, communicate with the first core network 54A or the second core network 54B based on the paging cycle assignments. Since the paging cycle assignments may not overlap in the time domain (e.g., are non-conflicting in the time domain), communications between the electronic device 10 and the core networks 54 sent according to the paging cycle assignments are not interrupted, thereby permitting use of multiple SIM cards 64 operated to have a negligible or zero likelihood of missing or dropped communications.

In some cases, the electronic device 10 includes the first SIM card 64A and the second SIM card 64B, where the second SIM card 64B has a higher priority associated with its communications. For example, the second SIM card 64B may correspond to a cellular network that broadcasts relatively high priority information (e.g., police communications). When the electronic device 10 is communicating with the first core network 54A, some communications may be missed by the electronic device 10 since the electronic device 10 may not be operated in a transmission period 78 when the communication is sent to the electronic device 10. To fix this, the second base station 52B may use the first radio access network 56A to allocate a transmission period 78 in the paging cycle assignment for the first SIM card 64A, such as by generating connected discontinuous receive mode (C-DRX) gaps, in response to receiving a notification that the second base station 52B has relatively high priority data to transmit to the electronic device 10. The electronic device 10 may, in response to identifying the transmission period 78, may switch frequencies and/or other configurations of the RF chains 58 to permit communication with the second base station 52B. After conclusion of the relatively high priority communication, the second base station 52B may prolong the transmission period 78 for the second SIM card 64B until a subsequent transition into an idle period 80 for the paging cycle assignment of the second SIM card 64B, such that normal operation may continue according to the paging cycle assignments.

Continued Discussions

Figure 23:
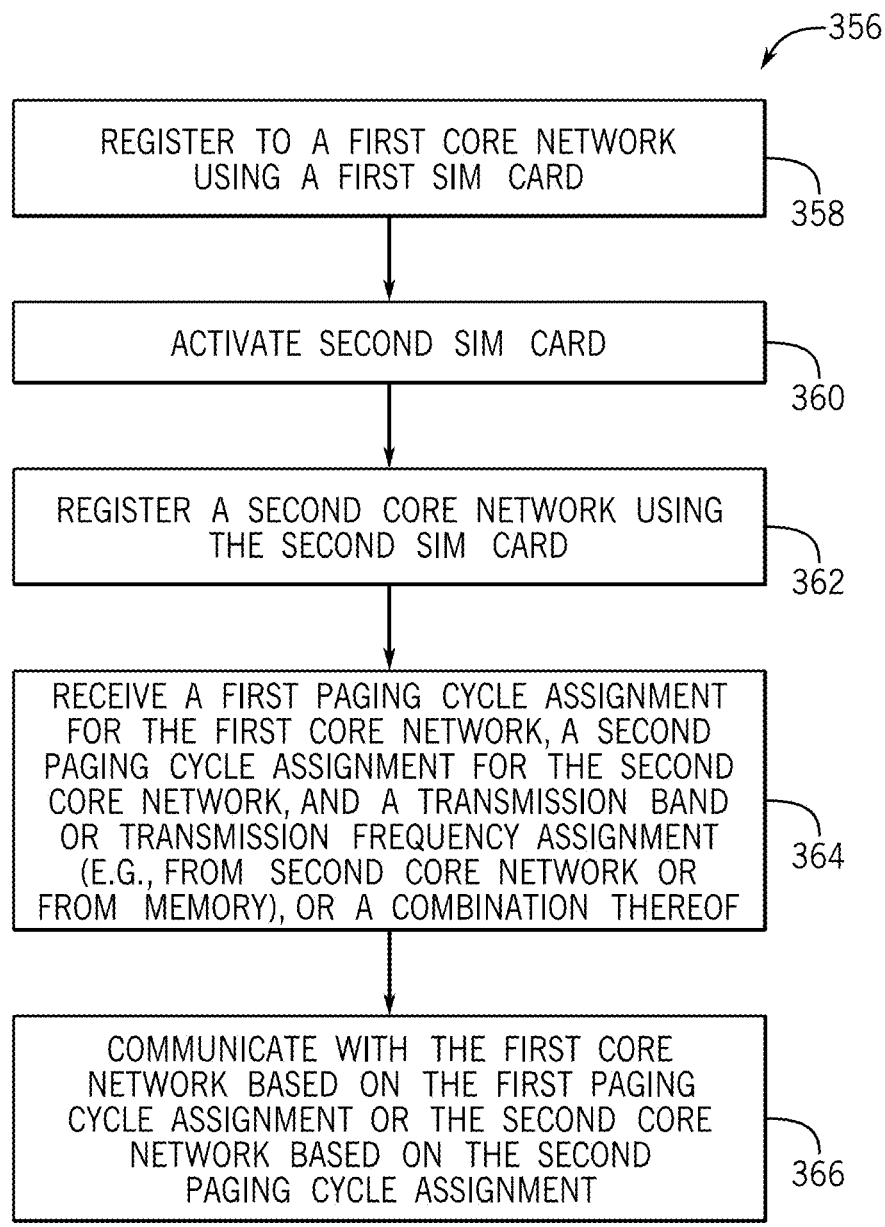
FIG. 23 is a flow chart illustrating a method for operating an electronic device in accordance with any one of the five examples of FIGS. 18-22 to communicate with the first base station and the second base station of FIG. 7 or FIG. 8, in accordance with an embodiment.

FIG. 23 is a flow chart illustrating a method 356 for operating the electronic device 10 to communicate with the first base station 52A and the second core network 54B that summarizes operations described above with reference to Embodiments Nos. 1-5 from Table 1. In some embodiments, the method 356 may be implemented at least in part by executing instructions stored in a tangible, non-transitory, computer-readable medium, such as the memory 14, using processing circuitry, such as processors 12, or the like. However, as described herein, the method 356 is described as being performed by the electronic device 10. It is noted that although depicted and/or described in a particular order, many operations described herein may be performed in any suitable order, and some operations may be skipped altogether.

At block 358, the electronic device 10 may register to the first core network 54A using the first SIM card 64A. Operations performed at block 94 of FIG. 10 may be performed at block 358 of FIG. 23, and thus are incorporated herein. At block 360, the electronic device 10 may activate the second SIM card 64B and, at block 362, may register to the second core network 54B using the second SIM card 64B. Operations performed at block 96 and block 98 of FIG. 10 may be performed at block 360 and block 362 of FIG. 23, and thus are incorporated herein.

At block 364, the electronic device 10 may receive respective paging cycle assignments for the first SIM card 64A and the second SIM card 64B. In some cases, the electronic device 10 may receive both of the paging cycle assignments after the electronic device 10 registers with the second base station 52B, however, in some embodiments, the paging cycle assignment associated with the first core network 54A before the electronic device 10 registers with the second base station 52B. The electronic device 10 may initially communicate with the core networks 54 according to an initial and/or a default paging cycle assignment until the electronic device 10 receives the paging cycle assignments from the first base station 52A and/or the second base station 52B. In some embodiments, the second base station 52B may generate the paging cycle assignment for the second SIM card 64B based on information transmitted directly to the second base station 52B by the first base station 52A (e.g., following operations of Embodiment No. 1, following operations of Embodiment No. 3). However, in some embodiments, the second base station 52B may generate the paging cycle assignment for the second SIM card 64B based on information transmitted to the second base station 52B by the electronic device 10 (e.g., following operations of Embodiment No. 2, following operations of Embodiment No. 4).

Furthermore, in some embodiments, at block 364, the electronic device 10 may receive a transmission band assignment or a transmission frequency assignment from the second core network 54B. The second core network 54B may select the transmission band assignment or the transmission frequency assignment from a set of preferred transmission bands or a set of preferred transmission frequencies transmitted to the second core network 54B by the electronic device 10. The electronic device 10 may identify compatible transmission bands or transmission frequencies to a transmission band or transmission frequency already assigned or allocated to the first SIM card 64A and/or the first core network 54A.

At block 366, the electronic device 10 may communicate with the first core network 54A or the second core network 54B based on the paging cycle assignments. Since the paging cycle assignments may not overlap (e.g., are non-conflicting), communication between the electronic device 10 and the core networks 54 are not interrupted, thereby permitting use of multiple SIM cards 64.

Figure 24:
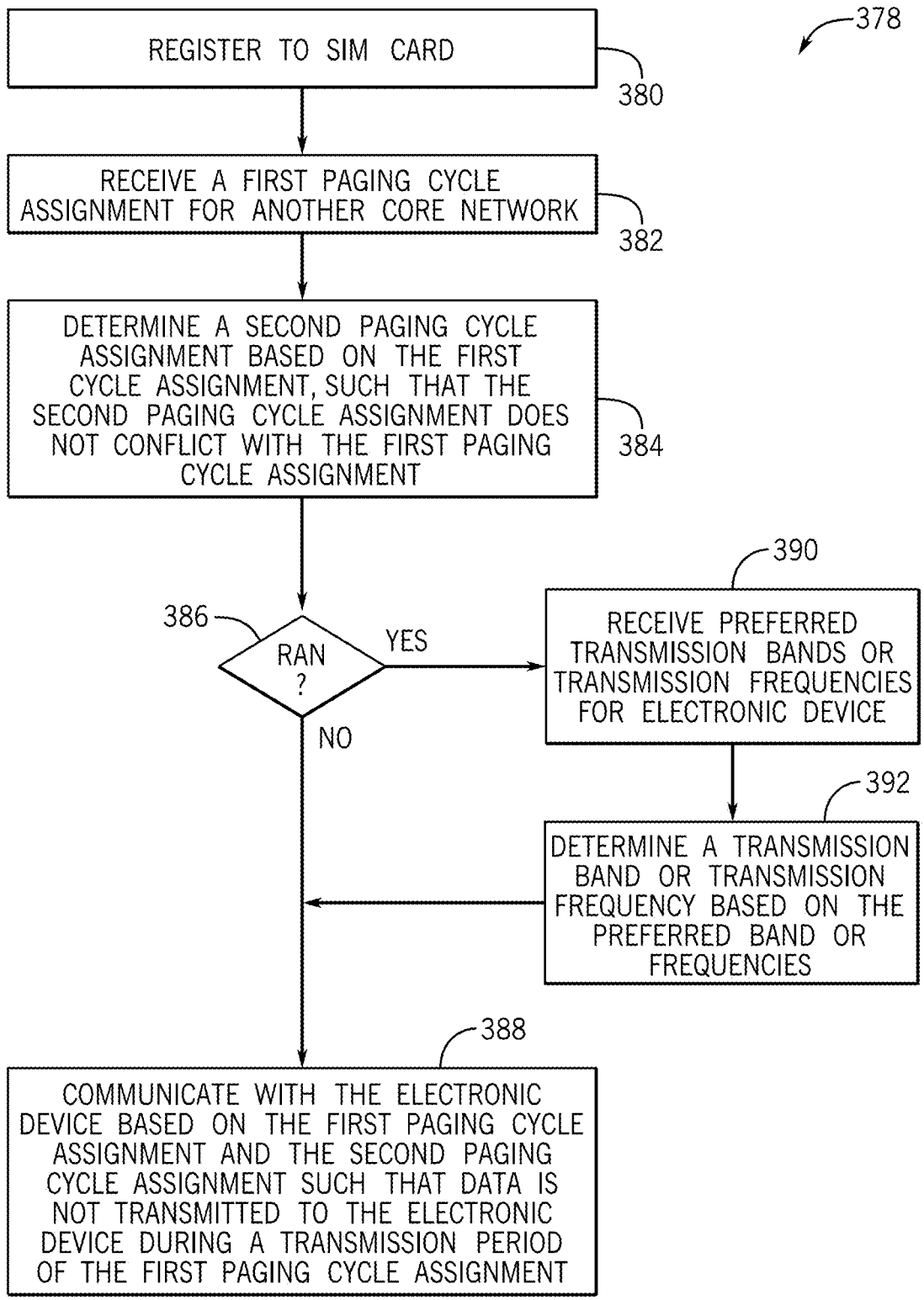
FIG. 24 is a flow chart illustrating a method for operating a base station in accordance with any one of the five examples of FIGS. 18-22 to communicate with another base station and an electronic device of FIG. 7 or FIG. 8, in accordance with an embodiment.

FIG. 24 is a flow chart illustrating a method 378 for operating a base station 52 to communicate with another base station 52 and the electronic device 10 as part of a that summarizes operations described above with reference to Embodiments Nos. 1-5 from Table 1. In some embodiments, the method 378 may be implemented at least in part by executing instructions stored in a tangible, non-transitory, computer-readable medium, such as the memory 14, using processing circuitry, such as processors 12, or the like. However, as described herein, the method 378 is described as being performed by a base station 52. It is noted that although depicted and/or described in a particular order, many operations described herein may be performed in any suitable order, and some operations may be skipped altogether.

At block 380, the base station 52 may register to a SIM card 64. As described above, registration may include verifying or authenticating a SIM card 64 of an electronic device 10 for communication with a core network 54 of the base station 52. To do so, the base station 52 may receive an identity number, such as an IMSI, from the SIM card 64 and/or electronic device 10. In some embodiments, the electronic device 10 may transmit a second identity number, such as a personal identification number (PIN), to the first SIM card 64A before the first SIM card 64A reveals the identity number to the electronic device 10. The base station 52 may include a memory 14, and thus may search the memory 14 to determine an encryption key corresponding to the identity number of the SIM card 64. The electronic device 10 and the base station may use the encryption key to encrypt and/or decrypt future communications with the first base station 52A. Registering to the first base station 52A may permit the electronic device 10 access to information transmitted via the first core network 54A.

At block 382, the base station 52 may receive a first paging cycle assignment for another core network 54. The base station 52 may use the first paging cycle assignment of the other core network 54 when determining a second paging cycle to assign for the core network 54, such as to determine a non-conflicting paging cycle assignment relative to preferences of the core network 54. The paging cycle assignment may define one or more transmission or communication periods for the electronic device 10 to transmit the data to a core network (e.g., the core network 54) and/or to receive data from a core network. In this way, the base station 52, at block 384, may determine a second paging cycle assignment based on the first paging cycle assignment, such that the second paging cycle assignment does not conflict with the first paging cycle assignment. The base station 52 thus reduces or eliminates a likelihood of dropped, interrupted, or missed communications between the core network 54 and the electronic device 10 by modifying transmission patterns of the core network 54 in response to the transmission patterns of the other core network 54. This may be considered a type of preemptive consideration to counteract transmission conflicts before a transmission conflict happens between the core networks 54.

At block 386, when the radio access network 56 is not considered, the base station 52 may, at block 388, communicate with the electronic device 10 based on the first paging cycle assignment and the second paging cycle assignment. In this way, the base station 52 does not transmit data to the electronic device 10 during a transmission period of the first paging cycle assignment and waits until a transmission period of the second paging cycle assignment.

However, when, at block 386, the radio access network 56 is considered, the base station 52 may, at block 390, receive a set of preferred transmission bands or transmission frequencies from the electronic device 10. The electronic device 10 may identify compatible transmission bands or transmission frequencies to a transmission band or transmission frequency already assigned or allocated to the first SIM card 64A and/or the first core network 54A. The base station 52 may, at block 392, determine the transmission band assignment or the transmission frequency assignment from a set of preferred transmission bands or a set of preferred transmission frequencies transmitted to the base station 52 by the electronic device 10. Then, at block 388, when the base station 52 communicates with the electronic device 10 using the second paging assignment, the base station 52 may also use the selected transmission band or transmission frequency when transmitting with the electronic device 10.

Technical effects of the present disclosure include systems and methods for adjusting transmission patterns of a base station based at least in part on determined transmission patterns of a base station or parameters associated with a first SIM card. By using paging cycle assignments to control when a base station transmits or receives information from an electronic device, the electronic device reduces or eliminates a likelihood of dropped or missing data transmitted (e.g., a communication) from the base station. This is at least in part because other base stations also communicatively coupled to the electronic device use non-conflicting transmission patterns when transmitting data to the electronic device, and thus may not transmit data at a time that may conflict with an ongoing communications.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method of operating an electronic device comprising a transmitter and a receiver, the method comprising:
    registering to a first network using a first subscriber identification module (SIM);
    after registering to the first network and before registering to a second network, transmitting, via the transmitter configured based on a default parameter, information to the second network, the information associated with multi-SIM operation of the first SIM and a second SIM;
    registering to the second network using the second SIM after transmitting the information;
    receiving, via the receiver, an indication of a communication pattern from first network or the second network based on registering to the first network and registering to the second network; and
    communicating, via the transmitter of the electronic device or the receiver, with the first network or the second network based on the communication pattern.

2. The method of claim 1, comprising:
    transmitting, via the transmitter configured based on the default parameter, a first SIM identification data to the first network;
    receiving, via the receiver, the indication of the communication pattern from the first network based on registering to the first network, the communication pattern comprising a paging cycle assignment, the registering to the first network being based on the first SIM identification data; and
    receiving, via the receiver, an indication of an additional communication pattern from the second network, the additional communication pattern comprising an offset assigned by the second network.

3. The method of claim 1, wherein communicating, via the transmitter or the receiver, with the first network or the second network based on the communication pattern comprises
    selecting a first radio access technology network from a plurality of radio access technology networks based on avoiding paging collisions, and
    communicating, via the transmitter or the receiver, based on the first radio access technology network.

4. The method of claim 1, comprising:
    communicating, via the transmitter or the receiver, with the first network at a first time according to the communication pattern; and
    communicating, via the transmitter or the receiver, with the second network at a second time according to the communication pattern.

5. The method of claim 1, comprising:
    registering the second SIM to the second network at a first time; and
    modifying a connection between the second SIM and the second network at a third time after the first time.

6. The method of claim 1, wherein the indication of the communication pattern indicates gaps corresponding to communications with the first network.

7. The method of claim 1, comprising:
receiving, via the receiver, an indication of a second transmission period being allocated relative to the communication pattern; and
communicating, via the transmitter or the receiver, with the other of the first network or the second network based on the second transmission period.

8. The method of claim 7, wherein the indication is associated with prioritizing communication to occur during the second transmission period.

9. An electronic device, comprising:
a transceiver; and
processing circuitry communicatively coupled to the transceiver, the processing circuitry configured to
register to a first network using a first subscriber identification module (SIM);
register to a second network using a second SIM at least in part by causing the transceiver to transmit, based on a default parameter, information associated with multi-SIM operation of the first SIM and the second SIM to the second network after registering to the first network and before registering to the second network;
cause the transceiver to receive an indication of a paging cycle assignment from first network or the second network based on registering to the first network and registering to the second network; and
cause the transceiver to communicate with the first network or the second network based on the paging cycle assignment.

10. The electronic device of claim 9, wherein the processing circuitry is configured to cause the transceiver to transmit an indication of a communication preference to the first network or the second network.

11. The electronic device of claim 10, wherein the indication of the communication preference comprises a gap preference of the electronic device.

12. The electronic device of claim 10, wherein the indication of the communication preference is associated with causing non-conflicting communications with the first network based on communications between the second network and the electronic device.

13. The electronic device of claim 9, wherein the processing circuitry is configured to cause the transceiver to transmit a multi-SIM indication indicating the first SIM and the second SIM.

14. The electronic device of claim 13, wherein the multi-SIM indication is transmitted via an access stratum (AS) signaling.

15. The electronic device of claim 9, wherein the first network is configured as a New Radio (NR) network, and the second network is configured as a Long Term Evolution (LTE) radio access network.

16. Tangible, non-transitory computer-readable media storing instructions that cause processing circuitry to:
register to a first network using a first subscriber identification module (SIM);
register to a second network using a second SIM at least in part by transmitting, via a transmitter communicatively coupled to the processing circuitry and configured based on a default parameter, information associated with multi-SIM operation of the first SIM and the second SIM to the second network after registering to the first network and before registering to the second network;
receive, via a receiver communicatively coupled to the processing circuitry, an indication of a communication pattern from first network or the second network based on registering to the first network and registering to the second network; and
communicate, via the transmitter, with the first network or the second network based on the communication pattern.

17. The tangible, non-transitory computer-readable media of claim 16, wherein the communication pattern comprises:
a first gap pattern corresponding to a plurality of time periods associated with receiving data from the first network; and
a second gap pattern corresponding to a plurality of time periods associated with receiving data from the second network.

18. The tangible, non-transitory computer-readable media of claim 17, wherein the first network or the second network is configured to generate the first gap pattern based on timing of the second gap pattern.

19. The tangible, non-transitory computer-readable media of claim 16, wherein the instructions cause the processing circuitry to:
transmit, via the transmitter, an indication of a communication gap pattern to the first network or the second network; and
communicate, via the transmitter, with the first network or the second network based on the communication gap pattern.

20. The tangible, non-transitory computer-readable media of claim 19, wherein the communication gap pattern comprises an indication of a connected mode discontinuous receive mode (C-DRX) gap.

* * * * *